(12) United States Patent
Krauer et al.

(10) Patent No.: US 8,049,460 B2
(45) Date of Patent: Nov. 1, 2011

(54) VOLTAGE DIVIDING VEHICLE HEATER SYSTEM AND METHOD

(75) Inventors: Jean-Pierre Krauer, San Jose, CA (US); Jeffrey Brian Straubel, Menlo Park, CA (US); Troy Adam Nergaard, San Francisco, CA (US); Ian Craven, San Carlos, CA (US); Arthur Joseph Hebert, San Carlos, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 777 days.

(21) Appl. No.: 12/144,334

(22) Filed: Jun. 23, 2008

(65) Prior Publication Data

US 2009/0021221 A1  Jan. 22, 2009

Related U.S. Application Data

(60) Provisional application No. 60/950,600, filed on Jul. 18, 2007.

(51) Int. Cl.
*H02J 7/00* (2006.01)
*H01M 2/38* (2006.01)

(52) U.S. Cl. ......... 320/104; 320/134; 320/150; 429/434

(58) Field of Classification Search ................... 320/121, 320/153, 104, 134, 150, 135, 136, 151, 152, 320/154; 429/120, 154, 434, 435, 152
See application file for complete search history.

(56) References Cited

U.S. PATENT DOCUMENTS

| | | | | |
|---|---|---|---|---|
| 5,374,886 A | * | 12/1994 | Kohl et al. | 322/28 |
| 5,666,040 A | * | 9/1997 | Bourbeau | 320/118 |
| 5,696,436 A | * | 12/1997 | Kim et al. | 320/160 |
| 5,990,661 A | * | 11/1999 | Ashtiani et al. | 320/128 |
| 6,018,224 A | | 1/2000 | Cocconi | |
| 6,057,050 A | * | 5/2000 | Parise | 429/7 |
| 6,259,229 B1 | * | 7/2001 | Ashtiani et al. | 320/128 |
| 6,750,630 B2 | * | 6/2004 | Inoue et al. | 320/104 |
| 7,795,844 B2 | * | 9/2010 | Ichikawa et al. | 320/134 |
| 2004/0071003 A1 | | 4/2004 | Cocconi | |
| 2005/0264257 A1 | * | 12/2005 | Inui | 320/104 |
| 2008/0179040 A1 | * | 7/2008 | Rosenbaum | 165/61 |
| 2009/0033294 A1 | * | 2/2009 | Odajima et al. | 320/166 |

\* cited by examiner

*Primary Examiner* — Edward Tso
*Assistant Examiner* — Alexis Boateng
(74) *Attorney, Agent, or Firm* — Patent Law Office of David G. Beck

(57) ABSTRACT

An apparatus comprising a rechargeable battery pack installed in an electric vehicle, a power supply coupled to the rechargeable battery pack, the power supply operable to provide a charge voltage to perform charging operations on the rechargeable battery pack, a heater to heat a fluid to be circulated through the rechargeable battery pack, the fluid thermally coupled to a plurality of battery cells within the rechargeable battery pack, a switching circuit, the switching circuit coupled to the heater and to the power supply, the switching circuit operable in a first mode to couple the source of electrical power to the heater without coupling the source of electrical power to the rechargeable battery pack, the switching circuit operable in a second mode to couple a source of electrical power external to the electric vehicle to the power supply to form a recharging circuit in order to perform charging operations on the rechargeable battery pack.

23 Claims, 8 Drawing Sheets

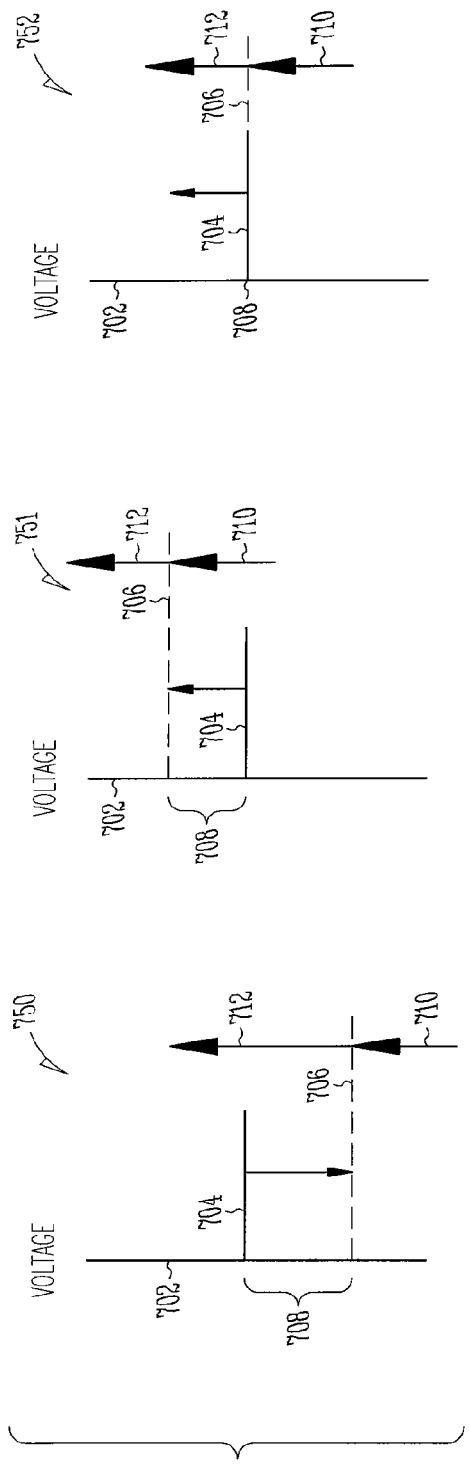
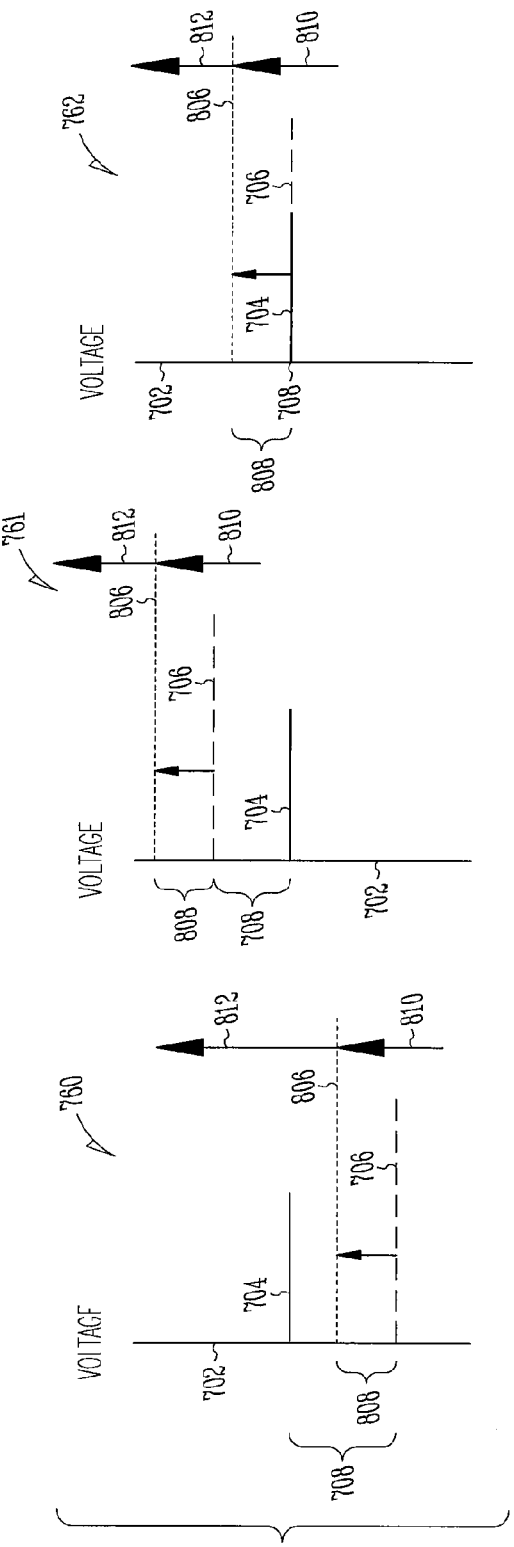
Fig. 6A
Fig. 6B

VOLTAGE DIVIDING VEHICLE HEATER SYSTEM AND METHOD

This application claims the benefit of priority under 35 U.S.C. 119(e) to U.S. Provisional Patent Application Ser. No. 60/950,600, filed on Jul. 18, 2007, which is incorporated herein by reference in its entirety.

BACKGROUND

Electric vehicles generally include vehicles that have some device, usually a battery, that stores energy, and that is operable to provide electrical power to one or more systems used, to at least in part, propel or to accelerate the electrical vehicle, or to provide the energy required for some motions of the vehicle. As the stored energy is consumed through either use in the electric vehicle or through some other form of energy dissipation, the source of the stored energy needs to be recharged in order to replenish the level of stored energy.

BRIEF DESCRIPTION OF THE DRAWINGS

FIG. 6A shows diagrams of voltage levels according to various embodiments of the present subject matter; and FIG. 6B shows diagrams of voltage levels according to various embodiments of the present subject matter.

DETAILED DESCRIPTION

In the following description, reference is made to the accompanying drawings that form a part hereof, and in which is shown by way of illustration specific embodiments which can be practiced. These embodiments are described in sufficient detail to enable those skilled in the art to practice the invention, and it is to be understood that other embodiments can be utilized and that structural, logical, and electrical changes can be made without departing from the scope of the present invention. The following description of example embodiments is, therefore, not to be taken in a limited sense, and the scope of the present invention is defined by the appended claims.

Electric vehicles (EVs) include vehicles that have one or more sources of stored energy designed to provide electrical energy to the vehicle, wherein the electrical energy is used to at least in part provide some energy used to propel the vehicle's motions. Electric vehicles can include vehicles designed to carry passengers, to transport goods, or to provide specialty work capabilities. For example, electric vehicles include passenger automobiles, trucks, and recreational water crafts such as boats. In addition, electric vehicles include specialty vehicles, such as fork trucks used to lift and move cargo, vehicles that incorporate conveyor belts to move objects, such as mobile conveyor belt vehicles used to load and unload cargo such as luggage from airplanes, and specialty equipment used in areas where exhaust fumes from typical gasoline, diesel, or propane powered equipment may present hazards to personnel, such as in underground mining operations. In various instances, electric vehicles are designed and intended to be operated on public highways as licensed automobiles, including both cars and trucks.

Generally, an electric vehicle includes some form of device or devices capable of storing energy and that is operable to provide electrical power to the vehicle. The electrical power may be used to at least in part provide energy for propelling the vehicle's motion. In some instances, the electrical power is used to provide the energy required for all of the vehicle's motion, including propelling the vehicle. In many instances, the source of the stored energy is a rechargeable battery pack. In various embodiments, a rechargeable battery pack includes a plurality of individual rechargeable battery cells that are electrically coupled to provide a rechargeable battery pack.

Figure 1:
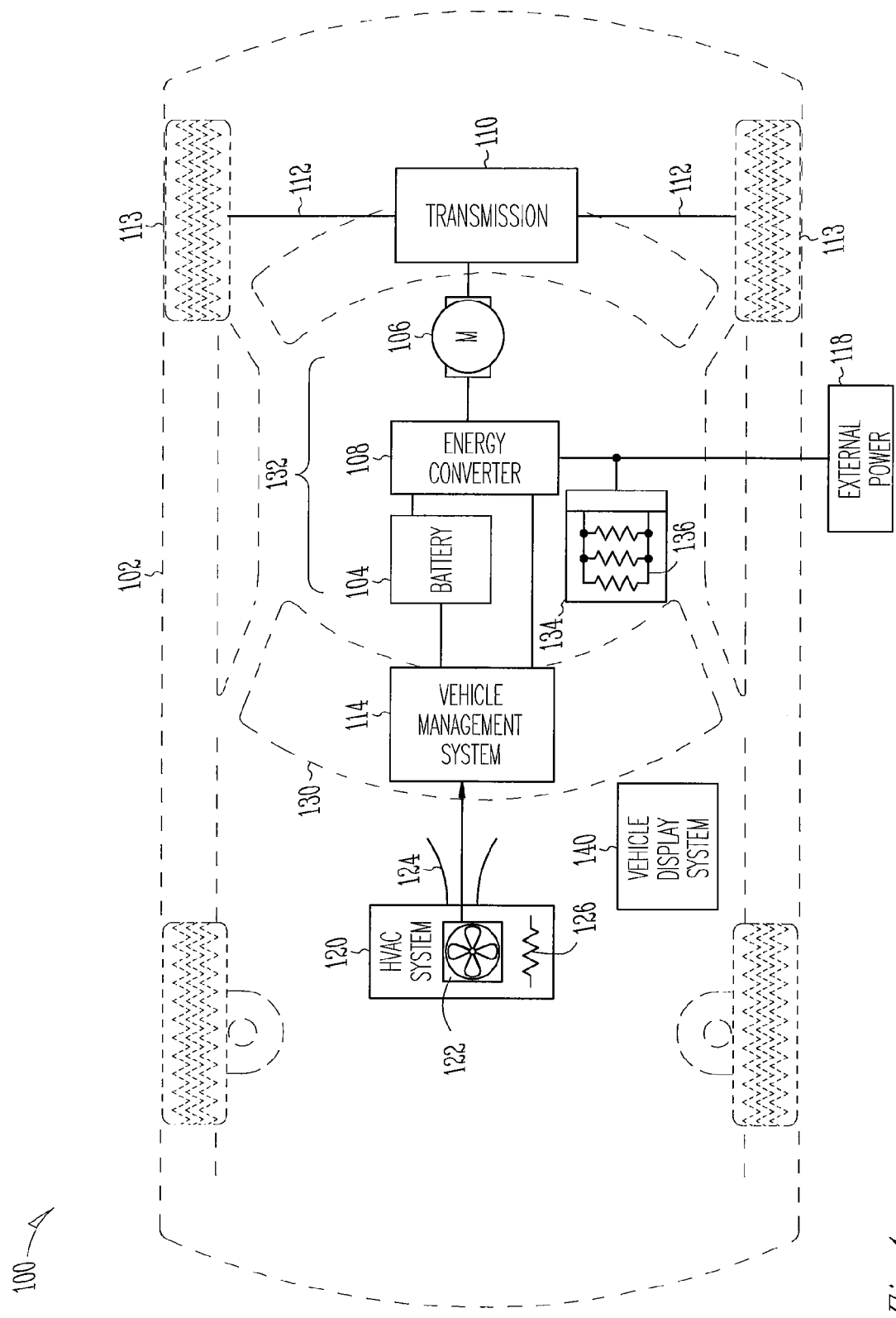
FIG. 1 shows a vehicle system according to various embodiments of the present subject matter.

FIG. 1 shows a vehicle system 100, according to various embodiments of the present subject matter. In various embodiments, the vehicle 102 is an electric vehicle, and includes a vehicle propulsion battery 104 and at least one propulsion motor 106 for converting battery energy into mechanical motion, such as rotary motion. The present subject matter includes examples in which the vehicle propulsion battery 104 is a subcomponent of an energy storage system ("ESS"). An ESS includes various components associated with transmitting energy to and from the vehicle propulsion battery. Various examples of components include safety components, cooling components, heating components, rectifiers, etc. The inventors have contemplated several examples of ESS and the present subject matter should not be construed to be limited to the configurations disclosed herein, as other configurations of a vehicle propulsion battery and ancillary components are possible.

The battery 104 includes a lithium ion battery in various examples. In some examples, the battery includes a plurality of lithium ion batteries coupled in parallel, coupled in series, or coupled in some parallel/series combination. Some examples include cylindrical lithium ion batteries. In some examples, the ESS includes one or more batteries compatible with the 18650 battery standard, but the present subject matter is not so limited. Some examples include approximately 6831 batteries which are interconnected. The vehicle propulsion battery 104, in some examples, provides approximately 390 volts.

Additionally illustrated is an energy converter 108. The energy converter 108 is part of a system which converts energy from the vehicle propulsion battery 104 into energy useable by the at least one propulsion motor 106. In some instances, the energy flow is from the at least one propulsion motor 106 to the vehicle propulsion battery 104. As such, in some examples, the vehicle propulsion battery 104 transmits energy to the energy converter 108, which converts the energy into energy usable by the at least one propulsion motor 106 to propel the electric vehicle. In additional examples, the at least one propulsion motor 106 generates energy that is transmitted to the energy converter 108. In these examples, the energy converter 108 converts the energy into energy which can be stored in the vehicle propulsion battery 104. In some examples, the energy converter 108 includes transistors. Some examples include one or more field effect transistors.

Some examples include metal oxide semiconductor field effect transistors. Some examples include one or more insulated gate bipolar transistors. As such, in various examples, the energy converter 108 includes a switch bank which is configured to receive direct current ("DC") power from the vehicle propulsion battery 104 and to output three-phase alternating current ("AC") to power the vehicle propulsion motor 106. In some examples, the energy converter 108 is configured to convert a three phase output from the vehicle propulsion motor 106 to DC power to be stored in the vehicle propulsion battery 104. Some examples of the energy converter 108 convert energy from the vehicle propulsion battery 104 into energy usable by electrical loads other than the vehicle propulsion motor 106. Some of these examples switch energy from approximately 390 Volts to 14 Volts.

The propulsion motor 106 is a three phase alternating current ("AC") motor, in various examples. Some examples include a plurality of such motors. The present subject matter can optionally include a transmission 110 in some examples. While some examples include a 2-speed transmission, other examples are contemplated. Manually clutched transmissions are contemplated, as are those with hydraulic, electric, or electrohydraulic clutch actuation. Some examples employ a dual-clutch system that, during shifting, phases from one clutch coupled to a first gear to another coupled to a second gear. Rotary motion is transmitted from the transmission 110 to wheels 113 via one or more axles 112, in various examples.

A vehicle management system 114 is optionally provided which provides control for one or more of the vehicle propulsion battery 104 and the energy converter 108. In some examples, the vehicle management system is coupled to a vehicle system which monitors safety (such as a crash sensor). In some examples the vehicle management system is coupled to one or more driver inputs (such as a speed adjuster, colloquially termed a throttle, although the present subject matter is not limited to examples having an actual throttle). The vehicle system is configured to control power to one or more of the vehicle propulsion battery 104 and the energy converter 108, in various embodiments.

An external power source 118 is operable to provide electrical energy for charging the vehicle propulsion battery 104, in various examples. In some examples, the external power source 118 transforms electrical power from a single phase 110 V AC power source into electrical power operable to charge the vehicle propulsion battery 104. In additional examples, the external power source is operable to transform power from a 220 V AC power source into electrical power operable to charge the vehicle propulsion battery 104. The present subject matter is not limited to examples in which a converter for converting energy from an external source to energy usable by the vehicle 102 is located outside the vehicle 102, and other examples are contemplated.

In various embodiments, vehicle system 100 includes a windshield 130 and a passenger compartment 132. Passenger compartment 132 includes one or more passenger seats 134. In various embodiments, a heater/ventilation/air-conditioning (HVAC) system 120 is included in vehicle system 100 to provide safety and comfort features for passengers (not shown in FIG. 1) within the passenger compartment 132. In various embodiments, HVAC system 120 includes a fan 122 and air ducts 124 operable to circulate heated or cooled air into the passenger compartment 132. In various embodiments, HVAC system 120 includes an electrically resistive heating element operable to heat air in the HVAC system 120 when electrical power is provided to heating elements 126. The heated air can be circulated by fan 122 in order to provide heat in the passenger compartment 132, and to provide safety functions, such as defrosting or defogging, of windshield 130.

In various embodiments, vehicle system 100 includes a vehicle display system (VDS) 140. VDS 140 is operable to display visual information about vehicle system 100, including information related to the state of the vehicle propulsion battery 104, including battery charge. In various embodiments, VDS 140 allows one or more inputs to be made to vehicle system 100. Inputs can be made through any device associated with the VDS 140 operable to allow inputs to VDS 140, including pushbuttons. In various embodiments, a display screen coupled to VDS 140 is a touch screen that allows inputs to be made to VDS 140. In various embodiments, VDS 140 allows inputs for making a selection of a charge level for the vehicle propulsion battery 104 included in vehicle system 100 related to one or more upcoming charge operations of the vehicle propulsion battery 104, or for a charging operation currently in process.

In various embodiments, one or more banks of electrically resistive heating elements 136 provide a heated seat for a passenger when electrical power is provided to the banks of heating elements 136. In various embodiments, either of heating element 126 or heating elements 136, or both, are used as part of a charging circuit as a voltage divider when performing a charging operation on the vehicle propulsion battery 104, as further described herein.

Figure 2A:
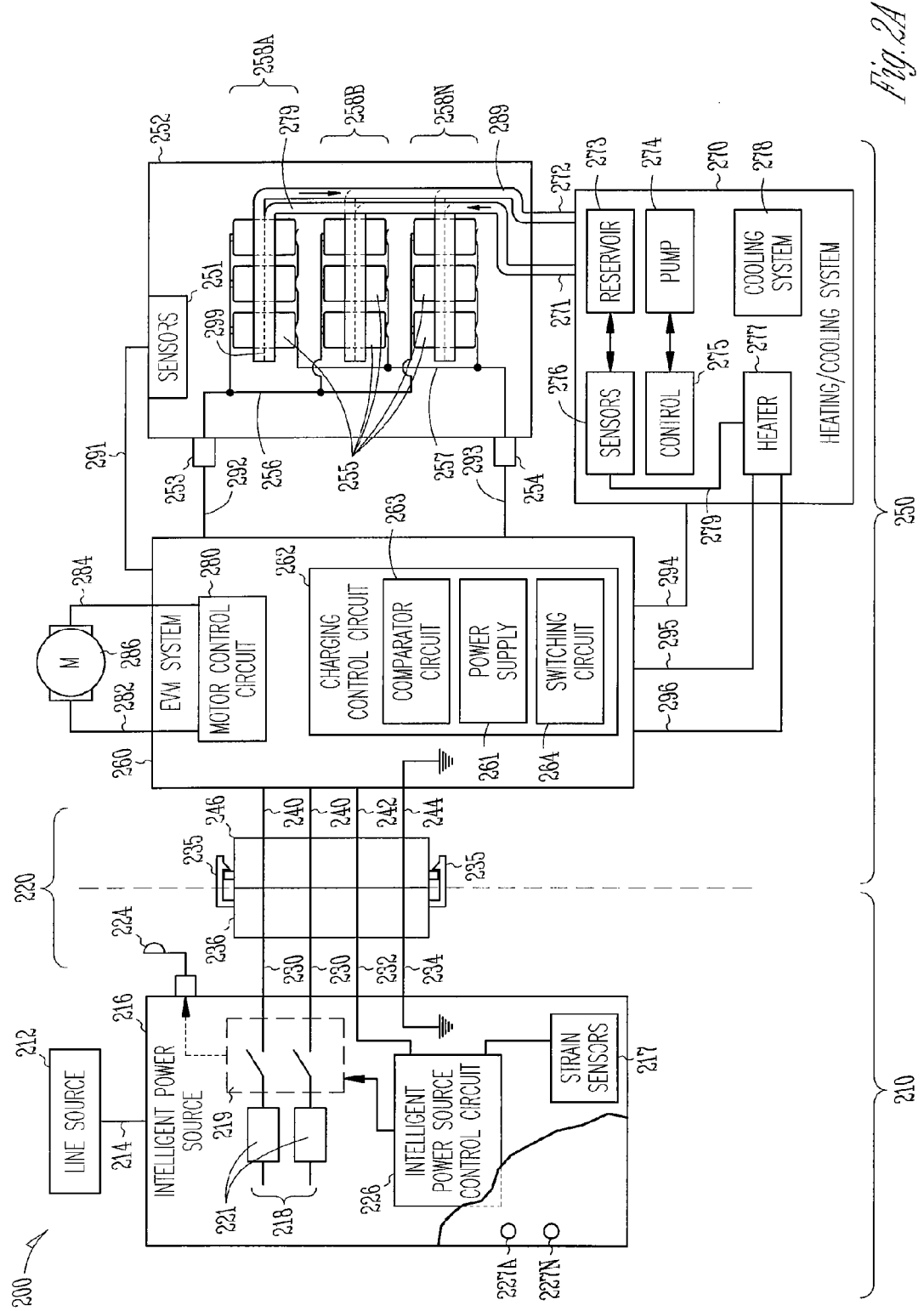
FIG. 2A shows a functional block diagram of a charging system for a battery pack according to various embodiments of the present subject matter.

FIG. 2A shows a functional block diagram of a charging system 200 for a battery pack 252 according to various embodiments of the present subject matter. In various embodiments, charging system 200 includes an electric vehicle 250 coupled to an intelligent power system 210. Electric vehicle 250 is not limited to any particular type of electric vehicle. In various embodiments, electric vehicle 250 includes the vehicle 102 as described with respect to FIG. 1. Intelligent power system 210 is not limited to any particular type of an intelligent power system. In various embodiments, intelligent power system 210 includes an intelligent power source 300 as described with respect to FIG. 3.

Referring again to FIG. 2A, intelligent power system 210 includes an intelligent power source 216 coupled to line source 212 through connection 214 and coupled to the electric vehicle 250 through connection 220. Electric vehicle 250 includes an electric vehicle management (EVM) system 260 coupled to a battery pack 252 and a heating/cooling system 270. Heating/cooling system 270 is mechanically coupled to battery pack 252 in order to provide heating and cooling of battery pack 252, as further described herein. Heating/cooling system 270 is electrically coupled to EVM system 260 as further described herein.

In various embodiments, EVM system 260 includes a motor control circuit 280 coupled to a drive motor 286 through connections 282 and 284. In various embodiments, motor control circuit 280 is operable to use power provided by battery pack 252 to condition and control electrical power provided to drive motor 286. In various embodiments, drive motor 286 is operable to propel electric vehicle 250. In various embodiments, motor control circuit 280 and drive motor 286 are only operable when electric vehicle 250 is physically disconnected from intelligent power system 210. In various embodiments, drive motor 286 is the propulsion motor 106 of FIG. 1.

In various embodiments, intelligent power system 210 is detachably coupled to electric vehicle 250 through connection 220. Detachably coupled refers to connection 220 being operable to be physically connected and disconnected, and thus operable to connect and disconnect, intelligent power system 210 to and from electric vehicle 250. When physically connected to electric vehicle 250, intelligent power system 210 is operable to provide electrical power to electric vehicle 250 over one or more connections 230 to one or more connections 240, wherein connections 240 are part of electric vehicle 250. In various embodiments, connection 220 includes a ground connection 234 coupled to a ground connection 244 in electric vehicle 250. In various embodiments, connection 220 includes a signal interconnect 232 coupled to interconnect 242 and coupled to intelligent power source control circuit 226 in the intelligent power system 210. Signal interconnect 232 and interconnect 242 are operable to allow communication and control signals to be transferred back and forth between intelligent power system 210 and electric vehicle 250. Interconnects 230, 240, 232, 242, 234, and 244 are not limited to any particular type of connections, and in various embodiments include any combinations of physical conductors, multi-conductor cables, bus lines, transmission lines, and wireless connections, operable to allow for power connections and communication and control signals to be transferred in either direction, or both directions, between intelligent power system 210 and electric vehicle 250. In various embodiments, connection 220 includes an automotive standard bus, such as a CAN bus, coupling intelligent power source control circuit 226 with the electric vehicle 250.

Connection 220 is not limited to any particular type of connection. In various embodiments, connection 220 includes a connector 236 that is part of the intelligent power system 210, and a connector 246 that is part of the electric vehicle 250. Connectors 236 and 246 are detachably connectable to allow a connection to be made between interconnects 230 and 240, and between interconnects 232 and 242, and between ground connections 234 and 244, as these interconnects are provided in connection 220. In various embodiments, connector 236 and 246 are standard pin and sleeve connectors designed to conform to some known standard type of connector.

In various embodiments, connector 236 is a custom-designed connector operable to couple to connector 246, wherein connector 246 is a custom and unique design intended to allow coupling only with a connector having a design matching connector 236.

In various embodiments, connection 220 is operable to couple intelligent power system 210 and electric vehicle 250 in order to allow charging of battery pack 252, and is operable to allow physically disconnecting intelligent power system 210 from electric vehicle 250 in order to allow electric vehicle 250 to move to areas away from, and free from any physical connections with, intelligent power system 210.

In various embodiments, intelligent power source 216 includes one or more strain sensors 217 coupled to the intelligent power source control circuit 226. In various embodiments, strain sensors 217 are operable to detect a level of strain on connection 220, such as a pulling force on connection 220, and to provide a signal that strain exists on the connection 220, (or in some embodiments, to stop providing a signal indicating that no strain exists in connection 220) to intelligent power source control circuit 226. In various embodiments, intelligent power source control circuit 226 is operable to remove power from connection 220 in response to a signal from the strain sensors 217, or in various embodiments, to remove power in response to not receiving a signal for the strain sensors 217—as in a fail-safe mode of operation. In various embodiments, intelligent power source 216 includes a plurality of indicators 227A-227N operable to visually indicate various conditions associated with charging system 200, including but not limited to an visual indication that connection 220 has received an excessive amount of strain resulting in a cable strain fault condition.

In various embodiments, connectors 236 and 246 include a mechanical, electrical, or electro/mechanical detent mechanism 235 operable to prevent connectors 236 and 246 from being physically disconnected if power is present and is applied to connection 220 through interconnects 230 and 240.

In various embodiments, line source 212 is coupled to intelligent power source 216 and is operable to provide electrical power to intelligent power source 216 for operations including charging operations of battery pack 252. Line source 212 is not limited to providing any particular voltage or type of electrical power. In various embodiments, line source 212 provides single phase electrical power. In various embodiments, line source 212 provides multi-phase electrical power, including but not limited to 3-phase electrical power, including but not limited to "wye" and "delta" arrangements. In various embodiments, line source 212 provides electrical power referenced to a ground level. Line source 212 is not limited to a particular voltage level. In various embodiments, line source 212 provides a voltage level at one of a commercially available electrical power supply voltage levels as provided by an electric utility company. In various embodiments, line source 212 provides a single phase, 220 volt alternating current (AC) source of electrical power. Line source 212, connection 214, intelligent power source 216, and connection 220 have conductors appropriately sized and constructed to carry the voltage and current levels used in the operations of the intelligent power system 210 and electric vehicle 250, including operations involving recharging of battery pack 252 from line source 212 through intelligent power system 210.

Various embodiments of intelligent power source 216 include one or more devices 218 for control of the electrical power delivered from line source 212 to electric vehicle 250 through intelligent power source 216. In various embodiments, devices 218 include one or more devices 221 for limiting the maximum current provided from intelligent power source 216 to connection 220. In various embodiments, devices 221 are fuses. In various embodiments, devices 221 include a circuit breaker. In various embodiments, devices 221 include a ground fault interrupt circuit in combination with a circuit breaker, wherein the ground fault interrupt circuit is operable to open the circuit breaker in the event a ground fault is detected.

In various embodiments, intelligent power source 216 includes switching circuit 219. Switching circuit 219 is operable to connect and to disconnect the electrical power provided from line source 212 to and from respectively connection 220 and thus, electric vehicle 250. In various embodiments, switching circuit 219 includes a mechanical relay. In various embodiments, switching circuit 219 includes solid state relays or other solid state switching devices. In various embodiments, intelligent power source control circuit 226 is coupled to switching circuit 219, and is operable to control opening and closing of switching circuit 219. In various embodiments, intelligent power source control circuit 226 provides a signal to cause switching circuit 219 to couple the line source 212 to connection 220, and when the signal is not present, switching circuit 219 is operable to disconnect line source 212 from connection 220. In various embodiments, intelligent power source control circuit 226 will cause switching circuit 219 to disconnect line source 212 from connection 220 when the status of strain sensors 217 indicates a level of strain on connection 220 above some given level, or when a signal from strain sensors 217 is not being received at intelligent power source control circuit 226 to indicate a safe condition with respect to the strain on connection 220.

In various embodiments, intelligent power source 216 includes a manual switch 224. In various embodiments, manual switch 224 is coupled to switching circuit 219 is and operable to allow connection and disconnection of line source 212 from connection 220 through the actuation of manual switch 224. In various embodiments, actuation of manual switch 224 to an "OFF" position disconnects line source 212 from connection 220 regardless of any signals from intelligent power source control circuit 226. In various embodiments, manual switch 224 must be actuated to an "ON" position in order for line source 212 to be electrically coupled to connection 220. In various embodiments, manual switch 224 must be in an "ON" position, and a control signal from intelligent power source control circuit 226 must also be provided in order for line source 212 to be electrically coupled to connection 220. In various embodiments, manual switch 224 includes an "OFF" position that allows manual switch 224 to be locked in the "OFF" position, using a locking device (not shown in FIG. 2A) such as but not limited to a padlock.

Connection 220 is operable to couple electrical power from line source 212 to EVM system 260. EVM system 260 is operable to couple electrical power received through connection 220 to battery pack 252 for performing charging operations on battery pack 252. In various embodiments, EVM system 260 receives electrical power from line source 212, and uses charging control circuit 262 to manipulate power supply 261 to provide as an output from power supply 261 a voltage source operable for use in recharging battery pack 252. Manipulation of the electrical power from line source 212 by charging control circuit 262 is not limited to any particular type or types of manipulation, and can include manipulation of the voltage level, providing current control, altering the number of phases, rectification of AC electrical power, filtering of the electrical power, and changing and the phase relationships between phases of any power provided from line source 212 through connection 220 to power supply 261. Charging control circuit 262 is not limited to any particular charger topology. Charging control circuit 262 can include any charging topology operable to perform the charging operation described herein, including by not limited to Boost, Buck, and flyback charger topologies.

In various embodiments, power supply 261 is operable to provide a voltage source for charging operations of battery pack 252 and to provide one or more other sources of electrical power at one or more different voltages for use in other functions requiring electrical power in electric vehicle 250. In various embodiments, power supply 261 provides electrical power for powering sensors, such as sensors 251 and 276, and for powering one or more devices including controls circuits and devices, such as control 275 and pump 274, as shown in FIG. 2A.

In various embodiments, battery pack 252 includes a plurality of battery cells 255. In various embodiments, subgroups of battery cells 255 are electrically coupled together to form bricks of battery cells, and one or more bricks are electrically coupled together to form sheets of battery cells. In various embodiments, battery pack 252 includes of a plurality of sheets 258A, and 258B through 258N. Within battery pack 252, the plurality of battery cells are coupled so that each of a first terminal of each of battery cells 255 is electrically coupled to a first output terminal 253 of battery pack 252, and a each of a second terminal of each of battery cells 255 is electrically coupled to a second output terminal 254 of battery pack 252. Individual battery cells 255 can be coupled within battery pack 252 in various combinations of series and parallel connections, depending on the desired output voltage and desired current requirements of battery pack 252.

In various embodiments, battery pack 252 is mechanically coupled to heating/cooling system 270. In various embodiments, heating/cooling system 270 is operable to heat and to cool a fluid that is circulated through battery pack 252 in order to control the temperature within battery pack 252. In various embodiments, battery pack 252 includes a network of tubing 299 in thermal contact with one or more of the plurality of battery cells 255. In various embodiments, tubing 299 is in thermal contact with each of the plurality of battery cells 255 within battery pack 252. Tubing 299 is formed of a material, such as a metal, that allows thermal transmission between the battery cells 255 and the tubing 299. When a fluid is circulated through tubing 299, the fluid is operable to conduct heat to or away from the plurality of battery cells 255, depending on the temperature of the fluid circulating in tubing 299. The fluid is not limited to any particular type of fluid, and can include any type of fluid operable to circulate through tubing 299 and transfer heat to and away from battery cells 255. In various embodiments, the fluid has a low freezing temperature wherein the fluid consist of a water and glycol mixture similar to that used as an anti-freeze in a typical automobile radiator. In various embodiments, tubing 299 is fluidly and mechanically coupled to heating/cooling system 270 through tubes 279 and 289.

In various embodiments, heating/cooling system 270 includes a reservoir 273 for holding a quantity of fluid and coupled through tubes 271 and 272 to the one or more networks of tubing 299 within battery pack 252. In various embodiments, heating/cooling system 270 includes heater (heating element) 277 operable to heat the fluid circulated by pump 274 though tubes 271, 272 and tubing 299. Heater 277 not limited to any particular type of heater. In various embodiments, heater 277 is a resistive type heating element operable to produce heat when electrical energy is provided to heater 277 through electrical connections 295 and 296. Heater 277 is not limited to being located in any particular location. Heater 277 can be located in any location that allows heater 277 to heat the fluid in heating/cooling system 270 being circulated through tubing 299. In various embodiments, heater 277 is located in reservoir 273. In various embodiments, heater 277 is located in line in one of tubes 271, 272, and tubing 299.

In various embodiments, heating/cooling system 270 includes a cooling system 278 for cooling the temperature of the fluid in reservoir 273 and circulating the fluid through tubing 299. The cooling system 278 is not limited to any particular type of cooling system, and in some embodiments includes a compressor and an a separate refrigeration system for cooling the fluid.

In various embodiments, heating/cooling system includes sensors 276. Sensors 276 are operable to sense one or more parameters associated with heating/cooling system 270, including a temperature of the fluid in reservoir 273, or the fluid temperature as it is circulated to or from battery pack 252, and a rate or a volume of flow of the fluid as it is circulated through battery pack 252. In various embodiments, one or more of sensors 276 are operable to sense a temperature of heater 277. In some embodiments, the sensor is operable to provide an output signal to the EVM system 260 indicating a temperature of heater 277. In various embodiments where the temperature of the heater 277 is provided to EVM system 260, EVM system 260 is operable to disconnect electrical power from heater 277 if the temperature of heater 277 exceeds a given temperature.

In various embodiments, charging of battery pack 252 is only enabled when battery pack 252 is within a given range of temperatures. In various embodiments, when battery pack 252 is not within a temperature range designated as an allowable temperature for charging operations on battery pack 252, charging control circuit 262 is operable to provide control 275 with control signals in order to have heating/cooling system 270 circulate heated or cooled fluid through tubes 279 and 289, and through tubing 299 within battery pack 252 in order to adjust the temperature of battery pack 252 to a temperature that is acceptable for initiating, or for continuing with, a charging operation of battery pack 252. In various embodiments, sensors 251 within battery pack 252 are used to determine the temperature within battery pack 252.

In various embodiments, sensors 251 are operable to sense other conditions within battery pack 252 that determine whether or not a charging operation can be initiated, or continued if a charging operation is already in progress, on battery pack 252. In various embodiments, sensors 251 determine a level of humidity within battery pack 252, and a dew point of ambient air in or surrounding the battery pack 252. In various embodiments, based on the temperature, humidity, and dew points sensed, a determination is made to operate heating/cooling system 270 in order to change the temperature, and in some instances the humidity, within battery pack 252 before a charging operation is initiated, or during the charging operation. In some instances, a thermal response in battery cells 255 to the charging operation, which could lead to moisture condensation within battery pack 252, triggers heating/cooling system 270 to make a temperature adjustment within battery pack 252, either before or during the charging operation, or both before and during the charging operation.

In various embodiments, sensors 251 include smoke detectors operable to detect the presence of smoke within battery pack 252. In various embodiments, detection of smoke within battery pack 252 results in a signal being provided to charging control circuit 262 operable to cause charging control circuit 262 to terminate a charging operation of battery pack 252 by disconnecting any voltage source providing a charge voltage to battery pack 252 from line source 212. In various embodiments, one or more signals from sensors 251 or 276, or a combination of signals from these sensors, are used to set fault conditions, or provide a status for various indications in charging system 200. By way of illustration, a signal from sensors 251 indicating the detection of smoke can be transmitted to intelligent power source 216 and results in one of indicators 227A-227N visually indicating a smoke detection fault. In various embodiments, the status signals are provided through interconnect 232 and 242 of connection 220.

In various embodiments, charging control circuit 262 is operable to determine a voltage level provided from line source 212 through connection 220. In various embodiments, the determined voltage level is a peak-to-peak voltage of a sinusoidal voltage waveform providing the electrical power from line source 212. In various embodiments, the determined voltage level is a peak voltage a sinusoidal voltage waveform providing the electrical power from line source 212. By way of illustration, for a line source including a single phase alternating current having a nominal voltage of approximately 220 rms (root-mean-square) volts, the power source would have a peak-to peak voltage of approximately 622 volts, and a peak voltage of half the peak-to-peak voltage, or approximately 311 volts. Based on the determined voltage level provided from line source 212, in various embodiments a comparator circuit 263 determines a line voltage offset value. The line voltage offset value can be either a higher or a lower value than the determined voltage level provided from line source 212. In various embodiments, the line voltage offset value is determined by adding an offset value to the determined voltage level from the line source. The offset value may be a negative value, a positive value, or zero. In instances where the offset value is negative, adding the offset value to the determined voltage level from the line source results in a line voltage offset value less than the determined voltage level from the line source. In instances where the offset value is positive, adding the offset value to the determined voltage level from the line source results in a line voltage offset value greater than the determined voltage value from the line source. In instances where the offset value is zero, adding the offset value to the determined voltage level from the line source results in a line voltage offset value being the same as the determined voltage value from the line source.

FIG. 6A shows diagrams 750, 751, and 752. Each of diagrams 750, 751, and 752 includes a vertical voltage axis 702, and illustrates a comparison of the determined voltage level from the line source 704 to a line voltage offset value 706. In diagram 750, the offset value 708 is negative, and when added to the voltage level of line source 704 results in a line voltage offset value 706 that is less than the determined voltage level from the line source 704. In diagram 751, the offset value 708 is positive, and when added to the voltage level of line source 704 results in a line voltage offset value 706 that is greater than the determined voltage level from the line source 704. In diagram 752, the offset value 708 is zero, and when added to the voltage level of line source 704 results in a line voltage offset value 706 that is equal to the determined voltage level from the line source 704.

In various embodiments, charging control circuit 262 is operable to determine a voltage level present between the first terminal 253 and the second terminal 254 of battery pack 252 as provided by the battery cells 255 within battery pack 252. In various embodiments, charging control circuit 262 includes the comparator circuit 263. Comparator circuit 263 is operable to compare the voltage level determined from the line source 212 and the voltage level provided across the terminal 253 and 254 of battery pack 252, and to provide an output signal if the voltage level at terminals 253 and 254 is less than the calculated value of the line voltage offset value. Referring again to FIG. 6A, in each of diagrams 750, 751, and 752, arrow 710 represents values for the voltage level across terminals 253 and 254 that are less than the calculated line voltage offset value 706, and arrow 712 represents values for the voltage level across terminals 253 and 254 are equal to or greater than the calculated line voltage offset value 706. Upon initiation of a charging operation of battery pack 252, for any voltage levels across terminals 253 and 254 that falls within the range represented by arrow 710, comparator circuit 263 is operable to provide an output signal indicating that heating element is to be included in the charging circuit and acting as a voltage divider in the charging circuit when charging operation is initiated. In various embodiments, the heating element will remain in the charging circuit until comparator circuit 263 has determined that the heating element is to be bypassed in the charging circuit, as described herein.

It would be understood that comparator circuit 263 is not limited to being implemented in hardware, software, or in firmware. In various embodiments, comparator circuit 263 includes a hardware comparator circuit. In various embodiments, comparator circuit 263 uses a microcontroller to perform the comparator functions. In various embodiments, Digital Signal Processing (DPS) is used to perform the comparator functions.

In various embodiments, during a charging operation in which the heating element is included in the charging circuit, comparator circuit 263 is operable to compare the voltage level determined from the line source 212 and the voltage level provided across the terminals 253 and 254 of battery pack 252, and to provide an output signal if the voltage level at terminals 253 and 254 is less than the calculated value of a bypass threshold value for the voltage offset value.

FIG. 6B shows diagrams 760, 761, and 762. Each of diagrams 760, 761, and 762 illustrate a comparison of the determined voltage level from the line source 704 to a line voltage offset value 706, and a calculated voltage level representing a bypass threshold value 806. In diagram 760, the offset value 708 is negative, and when added to the voltage level of line source 704 results in a line voltage offset value 706 that is less than the determined voltage level from the line source 704. Bypass threshold value 806 is calculated by adding a value 808 to the line voltage offset value 706. In diagram 761, the offset value 708 is positive, and when added to the voltage level of line source 704 results in a line voltage offset value 706 that is greater than the determined voltage level from the line source 704. Bypass threshold value 806 is calculated by adding a value 808 to the line voltage offset value 706. In diagram 762, the offset value 708 is zero, and when added to the voltage level of line source 704 results in a line voltage offset value 706 that is equal to the determined voltage level from the line source 704. Bypass threshold value 806 is calculated by adding a value 808 to the line voltage offset value 706.

Referring again to FIG. 6B, in each of diagrams 760, 761, and 762, arrow 810 represents values for the voltage level across terminals 253 and 254 that are less than the bypass threshold value 806, and arrow 812 represents values for the voltage level across terminals 253 and 254 are equal to or greater than the bypass threshold value 806. During charging operation including the heating element, when the monitored voltage level across terminals 253 and 254 remains in the range of values for arrow 810, the heating element will remain in the charging circuit. For any of the voltage levels across terminals 253 and 254 represented by arrow 820, the heating elements will be bypassed in the charging circuit. In instances where the heating element is included in a charging circuit and the voltage level across terminals 253 and 254 increases from a range represented by arrow 810 up to the bypass threshold value 806, charging control circuit 262 is operable to bypass the heating element, and to continue charging the battery pack 252 with the heating element bypassed, as represented by arrow 812, and as further described herein.

By providing a line voltage offset value at a first voltage level wherein the heating element is included in the charging circuit when the battery pack voltage is less than the line voltage offset value, and by providing a bypass threshold value at a second and higher voltage level from the line voltage offset value, the bypass threshold value being a level wherein the heating element is removed from the charging circuit, the charging circuit includes a hysteresis band to control when to use the heating element included in the charging circuit upon initiation of a charging operation can be removed from the charging circuit.

Upon initiation of a charging operation of battery pack 252, for any voltage levels across terminals 253 and 254 that falls within the range represented by arrow 710, comparator circuit 263 is operable to provide an output signal indicating the heating element is to be included in the charging circuit when charging is initiated. In various embodiments, the heating element will remain in the charging circuit until comparator circuit 263 has determined that the heating element is to be bypassed in the charging circuit, as described herein.

In each of diagrams 760, 761, and 762, the bypass threshold value is higher then the line voltage offset value by a value range 808. Value range 808 represents a hysteresis band.

In operation, charging control circuit 262 receives the output signal from comparator circuit 263, and is operable to configure switching circuit 264 so as to include a the heating element as a voltage divider in the charging circuit used in the charging operation of battery pack 252. Having a series heating element in the charging circuit provides a voltage divider circuit for reducing the voltage applied to battery pack 252 by either dropping the line voltage provided to the inputs of the power supply providing the charging voltage, or by dropping the charging voltage provided by the power supply to the battery pack across the heating element. The voltage divider circuit, including the heating element, allows charging control circuit 262 to properly control the charging current provided to battery pack 252 when the difference between the determined voltage level of line source 212 and the terminal voltage level present at battery pack 252 exceeds the predetermined difference threshold voltage level.

In various embodiments, the heating element used in the charging circuit is heater 277. In various embodiments, the heating element is any electrically resistive conductive path that is operable to be used in a voltage divider circuit in a charging operation. In various embodiments, the heating element is a heating element used to heat an air flow circulated in a passenger compartment of electric vehicle 250. In various embodiments, the heating element uses a resistive element used to provide heat for defrosting a windshield of electric vehicle 250. In various embodiments, an electric fan is used to circulate the air past the heating element whenever the resistive heating element is used in a series circuit in the charging operation. In various embodiments, the heating element used is one or more of the resistive heating elements used to heat the passenger seats of electrical vehicle 250.

In various embodiments, switching circuit 264 is operable to provide a voltage source to terminals 253 and 254 that includes heater 277 coupled in series with terminals 253 and 254 and coupled across the voltage source provided by charging control circuit 262. Switching circuit 264 is also operable to bypass heater 277, and to couple the voltage source provided by charging control circuit 262 to terminals 253 and 254 without including heater 277. When heater 277 is included in series with the terminals of battery pack 252, heater 277 provides a voltage divider circuit with battery pack 252, wherein a portion of the voltage provided by the voltage source is dropped across heater 277, and the remainder of the voltage provided by voltage source is applied across terminals 253 and 254 to charge the battery cells 255 in battery pack 252. When heater 277 is bypassed, the entire voltage, less any loss in the connections 292, and 293, is applied to terminals 253 and 254 for use in charging the battery cells 255 within battery pack 252.

Figure 2B:
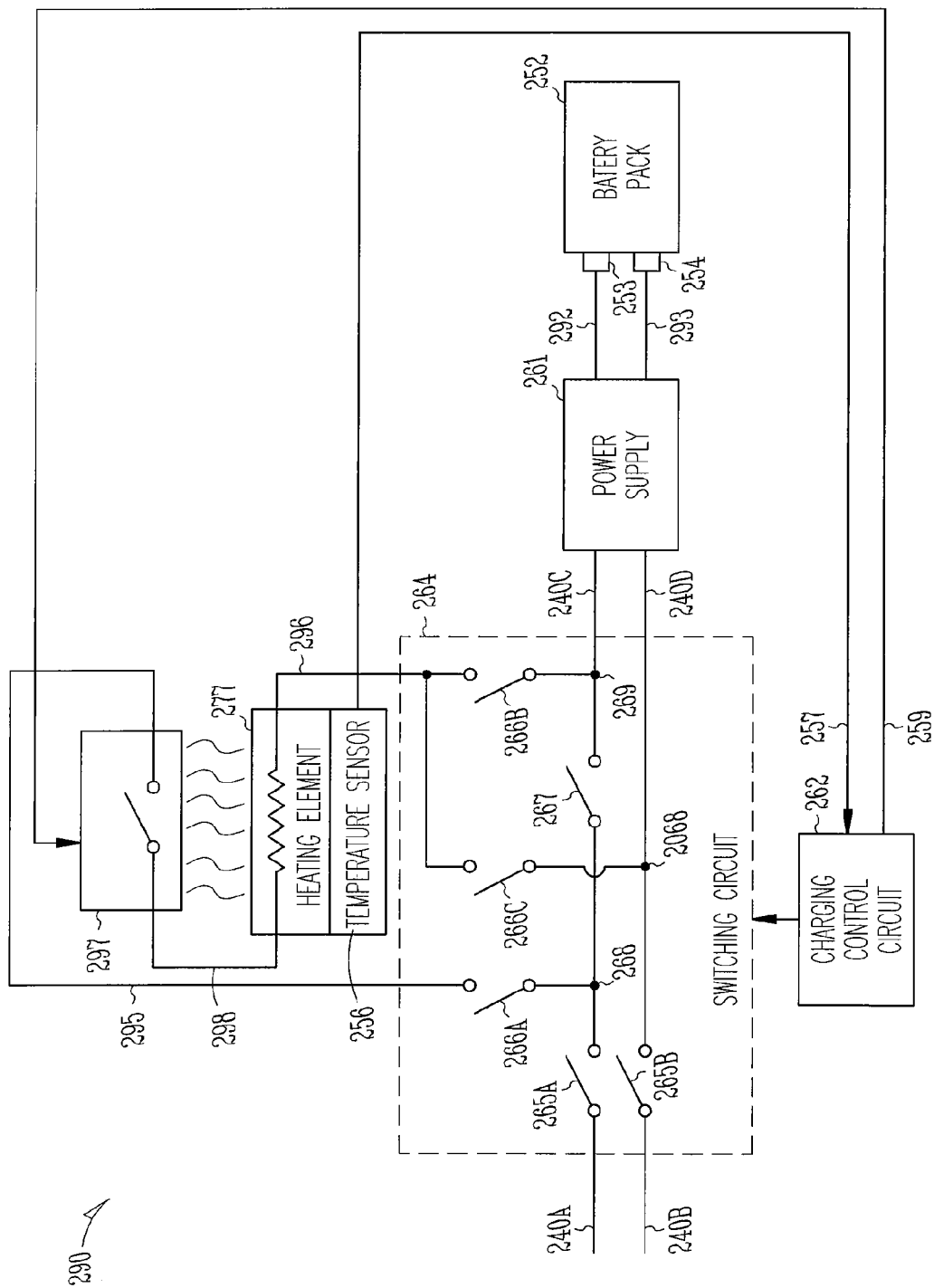
FIG. 2B shows a charging circuit according to various embodiments of the present subject matter.

FIG. 2B shows a charging circuit 290 according to various embodiments of the present subject matter. The same reference numbers are used in FIG. 2B to depict corresponding elements as depicted in FIG. 2A. FIG. 2B includes switching circuit 264, power supply 261, and battery pack 252. A first output of power supply 261 is coupled to terminal 253 of battery pack 252 through connection 292, and a second output of power supply 261 is coupled to terminal 254 of battery pack 252 through connection 293. Power supply 261 is operable to provide a voltage source at its first and second outputs for use in charging battery pack 252. Power supply 261 receives electrical power through connections 240C and 240D, and is operable to use the received electrical power to provide the voltage source for charging battery pack 252. Connection 240C and 240D are coupled to connection 240A and 240B respectively through switching circuit 264.

In various embodiments, interconnects 240A and 240B couple to interconnects 240 of connection 220, and provide the electrical power from line source 212 (as shown in FIG. 2A) to switching circuit 264. In various embodiments, switching circuit 264 is operable to connect or disconnect electrical power provided at connections 240A and 240B to heater 277 without coupling the power provided at connections 240A and 240B to power supply 261, and thus to power heater 277 without powering the power supply 261. In various embodiments, switching circuit 264 is operable to connect or disconnect electrical power provided at connections 240A and 240B to power supply 261, and to include or not include heater 277 in the coupling between connections 240A, 240B, and power supply 261. In various embodiments, switching circuit 264 is operable to connect or disconnect electrical power provided from connections 240C and 240D, as provided by power supply 261 and as powered by battery pack 252, to heater 277.

As shown in FIG. 2B, connection 240A is coupled to switch 265A, and connection 240B is coupled to switch 265B. Switch 265B is coupled directly to connection 240D, and when switch 265B is closed connection 240B is electrically coupled to connection 240D. Switch 265A is coupled to node 268, which is coupled to both switch 266A and switch 267. Switch 267 is coupled to node 269, which is coupled to switch 266B and connection 240C. When closed, switch 267 electrically couples switch 265A to connection 240C.

Switch 266A is coupled to node 268 and connection 295. Switch 266B is coupled to node 269 and to connection 296, and switch 266C is coupled to node 2068. Heater 277 is coupled to switching circuit 264 through connection 295, through switch 297, and connection 298 at one end of heater 277, and connection 296 at second end of heater 277. The heating element in FIG. 2B is not limited to heater 277 of FIG. 2A, and can include any heating element operable to provide a voltage divider in charging circuit 290. Charging control circuit 262 is coupled to switching circuit 264, and is operable to control each of switches 265A and 265B, 266A, 266B, 266C, and 267 included in switching circuit 264.

Charging control circuit 262 is operable to control whether switches 265A and 265B are open or closed. In various embodiments, charging control circuit 262 operates switches 265A and 265B together in conjunction with other switches in switching circuit 264 to either connect or disconnect electrical power provided at connections 240A and 240B to power just the heater 277 and not to power supply 261. In various embodiments, charging control circuit 262 operates switches 265A and 265B together to either connect or to disconnect electrical power provided on connections 240A and 240B to power supply 261. In addition, charging control circuit 262 is operable to control whether switches 266A, 266B, 266C, and 267 are open or closed in various combinations and at different times, in order to include heater 277 in the charging circuit 290, or to bypass heater 277 and to couple connections 240A and 240B to power supply 261 without including heater 277. In various embodiments, charging control circuit 262 operates to open switches 265A and 265B together to disconnect electrical power provided at connections 240A and 240B, and in conjunction with other switches in switching circuit 264, connects heater 277 across the connections 240C and 240D in order to provide heater 277 with electrical power provided by power supply 261, as power supply 261 is powered by battery pack 252.

In embodiments where heater 277 is electrically coupled to connections 240A and 240B without coupling any power provided at connections 240A and 240B to power supply 261, switching circuit is configured so that switch 266A and 266C are closed, and switch 267 and 266B are open. Once this configuration of switches 266A, 266B, 266C and 267 is present, an assuming switch 297 is closed, switches 265A and 265B can be closed to couple heater 277 to any electrical power being provided at connections 240A and 240B. In various embodiments, in this configuration of switching circuit 264, connection 295 of heater 277 is coupled to connection 240A through switch 265A and switch 266A, and connection 296 of heater 277 is coupled to connection 240B through switch 265B and 266C. Because switch 267 is open, power supply 261 is not connected to connection 240A, and so power supply 261 is not being powered from any electrical power provided at connections 240A and 240B.

In various embodiments, switch 297 is a thermally operated safety switch which remains closed unless a temperature at heater 277 is exceeded, in which case switch 297 opens to disconnect power from heater 277. Switch 297 is not necessarily present in all embodiments, but when present acts as a safety device to prevent overheating at heater 277.

In embodiments where electrical power provided at connections 240A and 240B is to be provided to power supply 261 in a charging operation, switches 265A and 265B are closed so as to couple any electric power provided at connection 240A and 240B to connections 240C and 240D as input power to power supply 261. In various embodiments where heater 277 is included in the charging circuit, charging control circuit 262 will operate to close both switches 266A and 266B and to open switch 266C and 267. Under these conditions, node 268 will be coupled to connection 295 through switch 266A, and node 269 will be coupled through switch 266B to connection 296. In this configuration, when switches 265A and 265B are closed, heater 277 will be coupled in series with the power supply 261 with respect to the electrical power provided at connection 240A and 240B, forming a voltage divider circuit for electrical power provided to the inputs of power supply 261.

When charging of the battery pack 252 is to occur with the heating element bypassed in the charging circuit, charging control circuit 262 will operate to open both switches 266A and 266B and to close switch 267. Switch 266C remains open. Under these conditions, node 268 will not be coupled to connection 295 through switch 266A, and node 269 will not be coupled through switch 266B to connection 296. Instead, node 268 will be coupled through switch 267 to node 269. In this configuration, when switches 265A and 265B are closed, heater 277 will by bypassed, and connection 240A will be coupled directly through switch 265A and switch 267 to connection 240C. In this configuration with the heating element bypassed, and when switched 265A and 265B are closed, power supply 261 will be provided at approximately the same voltage as supplied to connection 240A and 240B.

In various embodiments, when a charging operation is underway including heater 277 coupled in the charging circuit, and a determination is made to bypass heater 277, switches 265A and 265B are first actuated to open these switches so as to disconnect the power supply 261 from connections 240A and 240B, then switches 266A, 266B, 266C, and 267 are configured to bypass heater 277 by opening switches 266A and 266B, leaving switch 266C open, and closing switch 267. Once switches 266A, 266B, 266C, and 267 are set so as to bypass heater 277, switches 265A and 265B are then closed to re-connect power supply 261 to connections 240A and 240B with the heater 277 now bypassed in the charging circuit.

Charging control circuit 262 is operable to include or bypass heater 277 in a charging circuit based on output signals provided by comparator circuit 263, as described herein. By providing heater 277 in series with the line voltage being supplied to power supply 261, the input voltage level applied to the inputs of power supply 261 is reduced over the voltage levels present on connections 240A and 240B, and thus allows power supply 261 to maintain proper current regulation for charging battery pack 252. In various embodiments, as the voltage level of battery pack 252 is increased through the charging process, the voltage divider provided by heater 277 is no longer required, and heater 277 is bypassed to allow the voltage level present on connections 240A and 240B to be provided to the inputs of power supply 261. In various embodiments, charging control circuit 262 is operable to regulate the voltage across the heater 277 by controlling the current flow through heater 277. In various embodiments, the voltage drop across heater 277 is approximately one half the voltage of the line source being provided to the power supply 261. In various embodiments, when alternating current power is being provided from the line source power and the heater is included in the charging circuit, charging control circuit 262 is operable to energize the charging circuit for one or more cycles of the alternating current power, and to disconnect the alternating current power from the charging control circuit 262 for one or more cycles of the alternating current power, repeating this pattern a plurality of times in order to regulate the temperature of heater 277. In embodiments where direct current power is being provided as the line source power and the heater 277 is included in the charging circuit, the charging control circuit 262 is operable to switch the direct current power on and off in order to regulate the temperature of heater 277.

In various embodiments, heater 277 is protected from overheating conditions by switch 297, by sensor 256, or by a combination of both switch 297 and sensor 256. In various embodiments, switch 297 is a switch that is opened and closed depending on a temperature of the switch, such as but not limited to a bimetallic type switch. In various embodiments, switch 297 is operable to remain closed, and thus couple heater 277 to connections 295 and 296, when heater 277 is below a certain temperature, and to open when a given temperature at heater 277 is exceeded. Opening switch 297 disconnects any electrical power from having a path through heater 277, and thus is operable to prevent an overheating condition at heater 277. In various embodiments, sensor 256 is operable to sense a temperature at heater 277, and to provide a temperature signal related to the temperature of heater 277 to charging control circuit 262 through connection 257. In various embodiments, charging control circuit 262 is operable to send control signals over connection 259. In various embodiments, the control signals are used to open switch 297 based on a temperature signal from sensor 256, and thus to disconnect any electric power from having an electrical path through heater 277. In various embodiments, when switch 297 is opened during a charging cooperation, charging control circuit 262 is operable to detect that current is not being provided to power supply 261 through connections 240C and 240D, and to generate a charging fault condition signal.

In embodiments where heater 277 is connected across the connections 240C and 240D in order to provide heater 277 electrical power provided from power supply 261 and as powered by battery pack 252, switching circuit 264 is configured so that switches 266A, 266C and 267 are closed, and switches 265A, 265B, and 266B are open. Having switches 265A and 265B open isolates the heater 277 and the power supply 261 from any electric power present at connections 240A and 240B. Once this configuration of switches 266A, 266B, 266C and 267 is present, and switches 265A and 265B are opened, heater 277 is coupled across connections 240C and 240D and power supply 261. In this configuration of switching circuit 264, connection 295 of heater 277 is coupled to connection 240C through switch 266A and switch 267, and connection 296 of heater 277 is coupled to connection 240D through switch 266C. In this configuration, battery pack 252 is operable to provide electrical power to power supply 261 through connections 292 and 293, which in turn produces power from the power supply 261 at connections 240C and 240D to power heater 277. In various embodiments, this mode of powering heater 277 is included in a mode referred to as "vehicle to grid" mode. In various embodiments, when in "vehicle to grid" mode the vehicle that includes a charging control circuit 262, a power supply 261, and a battery pack 252 is not coupled to an intelligent charging station, and the vehicle is not being driven. In various embodiments, where no source of line voltages is being provided to connections 240A and 240B, switches 265A and 265B can be closed to that any electrical power provided by power supply 261 at connections 240C and 240D is available at connections 240A and 240B for powering other devices on electric vehicle 250, as further described herein.

The configuration of switches as depicted in FIG. 2B is not intended to be limiting, and is intended to show one possible arrangement of switches that could be used in switching circuit 264 to correspond with the switching functions as described herein. It would be understood that other arrangements of switches, including arrangements having a different number of switches as illustrated in FIG. 2B, could be used to perform the switching functions as described herein. Switches 265A, 265B, 266A, 266B, 266C, and 267, or any switches that are included in switching circuit 264 to perform the switching function described herein, are not limited to any particular type or types of switches. Any type switches, including but not limited to mechanical relays, solid state relays, and solid state devices such as switching transistors, can be used in various embodiments and in any combinations that provide the switching functions as described herein.

Figure 2C:
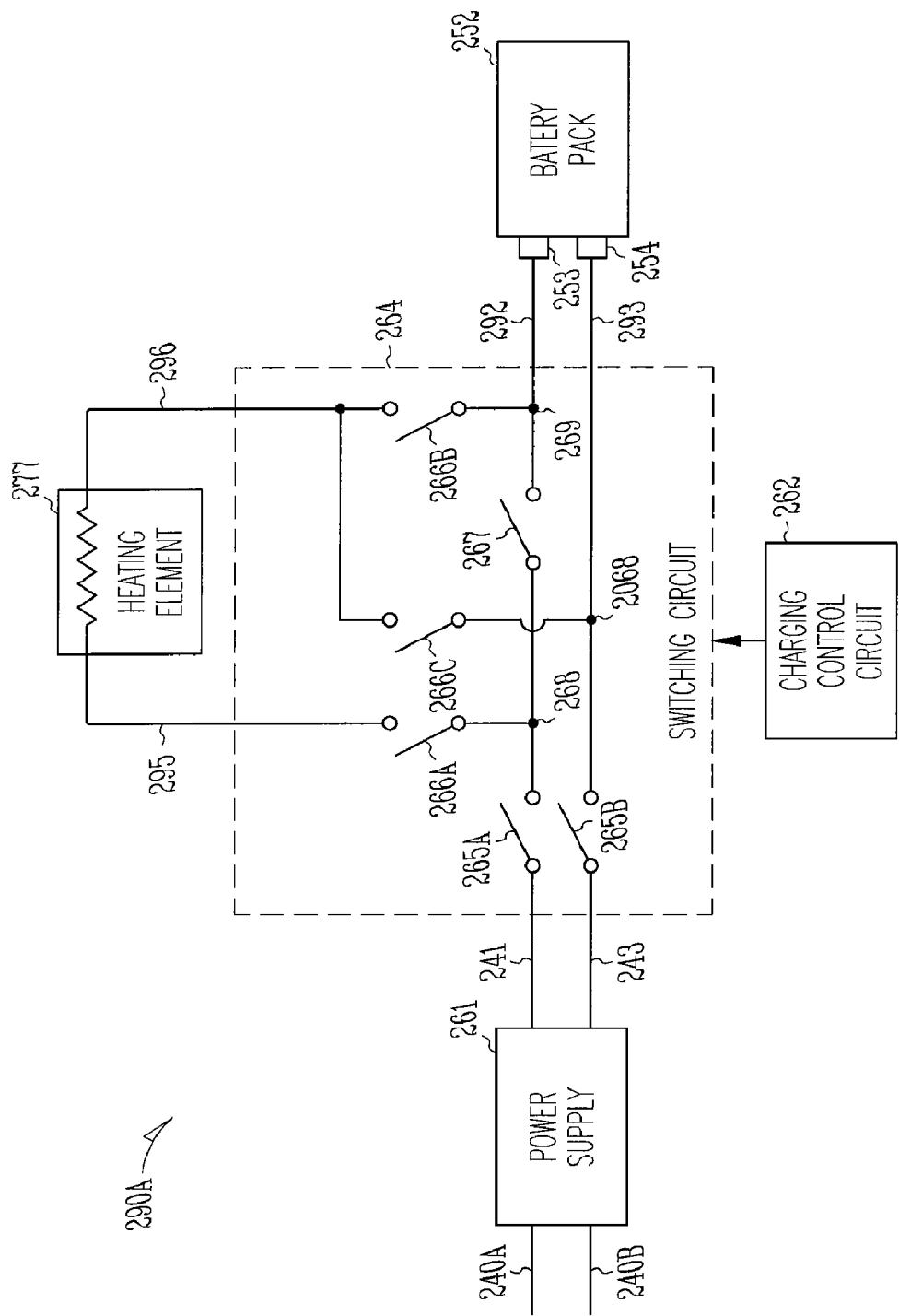
FIG. 2C shows a charging circuit according to various embodiments of the present subject matter.

FIG. 2C shows a charging circuit 290A according to various embodiments of the present subject matter. The same reference numbers are used in FIG. 2C to depict corresponding elements as depicted in FIG. 2A and FIG. 2B. FIG. 2C includes power supply 261 coupled to battery pack 252 through switching circuit 264. Various embodiments of charging circuit 290A operate switching circuit 264 as described above with respect to FIG. 2B, except that the switching circuit 264 and heater 277 are coupled to form a voltage divider circuit with the output voltage provided as an output from power supply 261 provided at power supply terminals 241 and 243. In FIG. 2C, when heater 277 is electrically coupled into charging circuit 290A, the output voltage from power supply 261 is divided between heater 277 and the battery pack 252. When heater 277 is bypassed in charging circuit 290A, the voltage output from power supply 261 is applied to battery pack 252.

In various embodiments of FIG. 2C, switching circuit 264 could be configured to power just the heater 277 from power supply 261 and not apply voltage to battery pack 252 by having switches 265A, 265B, 266A, and 266C closed, and switches 266B and 267 open. In various embodiments of FIG. 2C, switching circuit 264 could be configured to power heater 277 from the battery pack 252 by having switches 266A, 266C and 267 closed, and switches 265A, 265B, and 266B open.

Referring again to FIG. 2A and 2B, and while a charging operation is being performed on the battery pack 252, having heater 277 included in series in the charging circuit will produce some heat at heater 277 based on the amount of voltage across and the amount of current through heater 277. In various embodiments, heating/cooling system 270 will function to control and prevent overheating of both heater 277 and battery pack 252. In various embodiments, one or more of sensors 256 and 276 will monitor the temperature of heater 277, or of the fluid circulating in the heating/cooling system, or both, and will determine if cooling needs to be applied. In various embodiments, control 275 will turn on fluid circulation when heater 277 is included in the charging circuit. If the temperature of the heater 277 or of the fluid in the heating/cooling system 270 exceeds a pre-determined level, heating/cooling system 270 is operable to cool the fluid to prevent overheating. In various embodiments, control 275 is operable to provide a signal over connections 294 to charging control circuit 262 to indicate that the temperate of heater 277 or of the fluid circulating in heating/cooling system 270 cannot be maintained below a level deemed to be acceptable for battery recharging, and to remove the heater 277 from the charging circuitry. In such instances, if charging of the battery pack 252 can not be performed without the voltage drop provided by heater 277, the charging operation will be terminated until a temperate change at the battery pack 252 allows initiation of the charging operation.

In various embodiments, sensors 251 in battery pack 252 monitor one or more conditions within battery pack 252, and provides output signals though connection 291 to EVM system 260. In various embodiments, one or more of sensors 251 provides a signal representative of one or more temperatures within battery pack 252. In various embodiments, EVM system 260 determines that the temperature within one or more portions of battery pack 252 exceeds a level deemed to be appropriate for a charging operation. In such instances, if the heater 277 is included in the circuit being used to charge the battery pack, heater 277 is removed from the charging circuit. The charging operation will only continue on the battery pack if charging control circuit determines that a charging operation of the battery pack 252 can be performed without including heater 277 in the charging circuit.

In various embodiments, an alternative heating element other than heater 277 can be used to form the voltage divider in the charging circuit wherein heater 277 is not used from the charging circuit, and a different heating element as described herein, such as a heating element associated with the HVAC system, or a heating element associated with for example a seat heater in the passenger seat of the vehicle is coupled in the charging circuit in order to perform the recharging operations using a voltage divider arrangement and without further heating the battery pack 252.

In various embodiments, EVM system 260 includes one or more current control mechanism to provide a voltage at a controlled level of current to the charging circuit 290 and across first terminal 253 and second terminal 254 in order to perform the charging of battery pack 252 with a controlled current.

Thus, heater 277 is operable to have power applied across heater 277 in a plurality of operating modes. In a first mode, heater 277 is powered using the power provided from the AC line power provided by a source external to the vehicle in which heater 277 is located, such as the intelligent power source 216 as shown in FIG. 2A. In a second mode, heater 277 is coupled in a series arrangement in a charging circuit in order to perform a voltage dividing function on a voltage being utilized in the charging circuitry. The voltage being utilized in the charging circuitry can be either a voltage applied as in input to a power supply that is being used to charge a battery pack, or a voltage being provided as an output from a power supply that is being used to charge the battery pack. In a third mode, power is applied to heater 277 from the battery pack itself. This third mode can be employed to heat the battery pack in order to obtain better performance characteristics from the battery pack. In various embodiments, the vehicle where heater 277 is located is not being driven.

Figure 3:
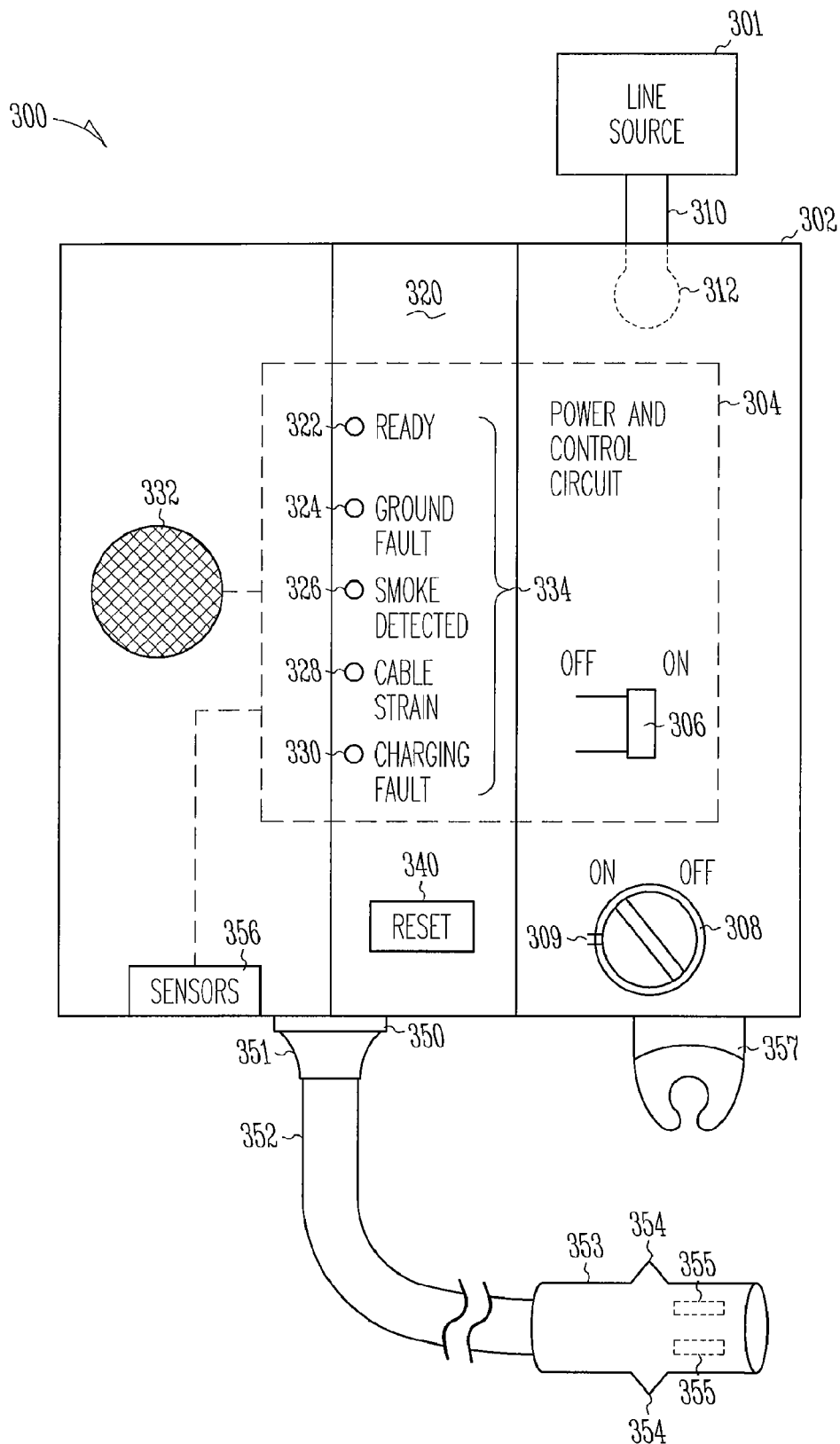
FIG. 3 shows an intelligent power source according to various embodiments of the present subject matter.

FIG. 3 shows a intelligent power source 300 according to various embodiments of the present subject matter. Intelligent power source 300 is not limited to any particular type of intelligent power source. In various embodiments, intelligent power source 300 is intelligent power source 210 as shown in FIG. 2A. Intelligent power source 300 includes an enclosure 302 coupled to a line source 301 through a connection 310. In various embodiments, connection 310 includes a conduit for electrical conductors, and the electrical conductors to couple electrical power from the line source 301 into enclosure 302. In various embodiments, enclosure 302 is operable to be mounted on a wall or other surface of a building structure, and to couple to connection 310 through an opening 312 in a rear side of enclosure 302.

In various embodiments, intelligent power source 300 includes a power and control circuit 304 within enclosure 302 and a connection including cable 352 exiting from enclosure 302 and terminating in a connector 353. Intelligent power source 300 is operable to couple incoming electrical power received from line source 301 through power and control circuit 304 to cable 352 so that the electrical power can be coupled to a plurality of terminals 355 included in connector 353. Power and control circuit 304 is operable to connect and to disconnect the electrical power received from line source 301 to and from cable 352 and connector 353. In various embodiments, enclosure 302 includes a surface 320 including an ON/OFF switch 308. ON/OFF switch 308 is operable to control the coupling of electrical power from line source 301 to cable 352. In various embodiments, when ON/OFF switch 308 is in the "OFF" position, the path for electrical power from line source 301 to cable 352 is physically disconnected. In various embodiments, when ON/OFF switch 308 is in the "ON" position, electrical power will be coupled from line source 301 to cable 352 only if all the other conditions in intelligent power source 300 allow such a coupling. In various embodiments, switch 308 includes a lockable portion 309 operable to allow switch 308 to be locked in the "OFF" position using a device, such as but not limited to a padlock (the padlock not shown in FIG. 3).

In various embodiments, enclosure 302 includes a protective device, such as a circuit breaker 306, mounded on the surface 320. Circuit breaker 306 is operable to disconnect an electrical path between the line source 301 and cable 352 when the circuit breaker 306 is in the OFF position, and to reconnect the electrical path between line source 301 and cable 352 when the circuit breaker is in the ON position.

In various embodiments, cable 352, in addition to one or more conductors coupled to terminals 355 and used to carry electrical power, includes one or more separate conductors to carry communication and control signals to and from power and control circuit 304 over cable 352. In various embodiments, the additional conductors carry communication and control signals received at and provided from power and control circuit 304. In various embodiments, the communication and control signals are used to determine a status for one or more indicators 334, including status indicators 322, 324, 326, 328, and 330 included on surface 320. In various embodiments, indicators 322, 324, 326, 328, and 330 are visual indicators, such as but not limited to indicator lamps or light emitting diodes. The type of information indicated by indicators 322, 324, 326, 328, and 330 is not limited to any particular type of information, and in various embodiments, includes one or more of a "READY," a "GROUND FAULT," a "SMOKE DETECTED," a "CABLE STRAIN," and a "CHARGING FAULT" indication. In various embodiments, intelligent power source 300 includes an audio output device 332, such as but not limited to a speaker or a beeper, operable to provide one or more audio outputs for indicating information. In various embodiments, a reset switch 340 is included on surface 320. In various embodiments, reset switch 340 is a ground fault interrupt circuit operable to provide an indication that a ground fault has occurred, for instance by actuating the reset switch to a fault position, and to allow resetting of the ground fault by actuating reset switch 340. In various embodiments, reset switch 340 provides a fault input to power and control circuit 304 in order to generate a fault condition that removes any electrical power provided by line source 301 from cable 352.

In various embodiments, intelligent power source 300 includes a holster 357 operable for retaining connector 353 so as to provide a place to physical hold connector 353 when cable 352 and connector 353 are not physically coupled to an electric vehicle for which the intelligent power source is designed to couple to during charging operations.

In various embodiments, cable 352 exits enclosure 302 through a device 350 such as a cord grip, wherein device 350 protects cable 352 from cut or puncture damage from any edges of enclosure 302, and provides strain relief for cable 352 against pulling or flexing forces applied to cable 352. In various embodiments, wire grip 351 is included over cable 352 and attached to device 350. Wire grip 351 is operable to provide physical protection to cable 352 and to provide further protection against pulling and flexing forces applied to cable 352. In various embodiments, a sensor 356 is included in enclosure 302. Sensor 356 is operable to sense a level of physical strain being applied to cable 352, and to provide a signal to power and control circuit 304, the signal including information related to the level of stain on cable 352. In various embodiments, based on the sensed physical strain placed on cable 352, power and control circuit 304 is operable to disconnect the electrical path coupling line source 301 with cable 352. This feature is a safety feature that aids in preventing electrical power from being applied to cable 352 after cable 352 may have been damaged as a result of the physical strain.

In various embodiments, connector 353 includes one or more coupling mechanisms 354. Coupling mechanisms 354 provide a mechanism for mechanically latching connector 353 into any mating connector (not shown in FIG. 3) that connector 353 is intended to couple to. In various embodiments, coupling mechanisms 354 prevent connector 353 from being physically disconnected from a mating connector by merely pulling on cable 352, and require some type of actuation be performed on coupling mechanisms 354 in order to remove connector 353 from a mating connector. In various embodiments, coupling mechanisms 354 can not be actuated if electrical power is provided to terminals 355, and requires the electrical power be removed from at least terminals 355 in order to actuate coupling mechanisms 354 and disconnecting connector 353 from a mating connector.

Figure 4A:
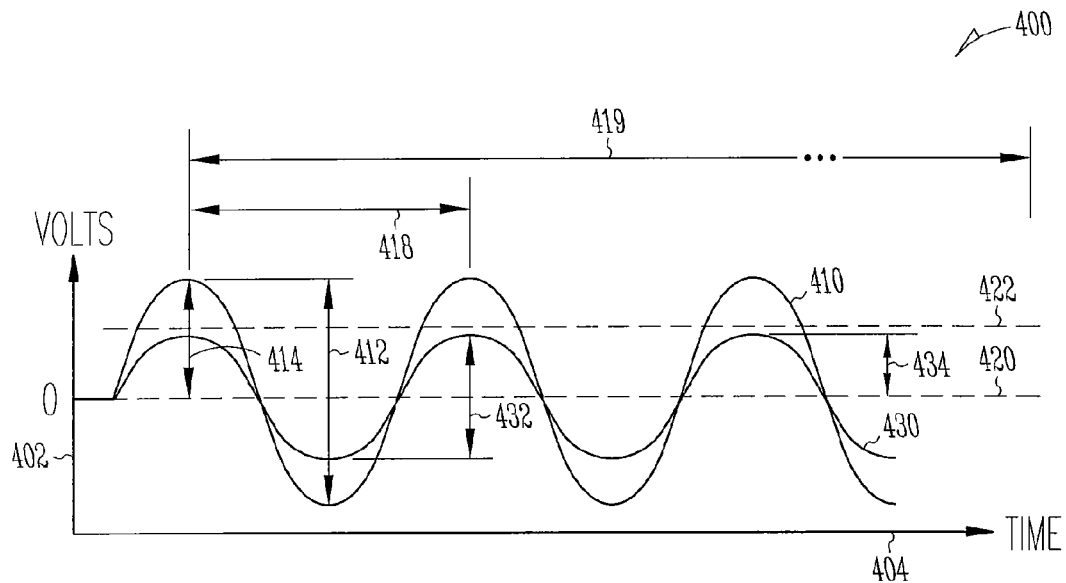
FIG. 4A shows a graph including a voltage waveform according to various embodiments of the present subject matter.

FIG. 4A shows a graph 400 including a voltage waveform 410 and voltage waveform 430 according to various embodiments of the present subject matter. In various embodiments, voltage waveform 410 is a voltage waveform of the electrical power received from a line source, such as line source 212 in FIG. 2, or from line source 301 in FIG. 3. In various embodiments, voltage waveform 410 is the voltage waveform provided to a power supply such as power supply 261 used in a charging operation when the heater is not included in the charging circuit, and waveform 430 is the voltage waveform provided to the power supply used in the charging operation when the heater is included in the charging circuit. In various embodiments, waveform 430 is derived from voltage waveform 410 by applying voltage waveform 410 to a voltage divider circuit formed using a heating element and a power supply used to provide the charge voltage during a charging operation.

Referring again to FIG. 4A, graph 400 includes a vertical axis 402 depicting voltage, and a horizontal axis 404 depicting time. Voltage waveform 410 depicts a variation in voltage over time. Voltage waveform 430 depicts a different variation in voltage over time. In various embodiments, voltage waveform 410 is a sinusoidal waveform having a period 418. A period refers to the time period for the sinusoidal waveform to complete one cycle (360 degrees). In various embodiments, period 418 is equal to the inverse of the frequency of the voltage waveform as provided in a commercially available electrical power source. In various embodiments, period 418 is a time period representative of voltage waveform having a frequency of 60 hertz. In various embodiments, period 418 varies for any particular portion of waveform 410 based on a power factor correction (PFC) applied by the entity providing the commercially available electrical power from which voltage waveform 410 is derived.

In various embodiments, waveform 410 includes a peak-to-peak voltage 412. In various embodiments, waveform 410 includes voltage levels relative to a given voltage level represented by line 420. In various embodiments, line 420 represents a voltage level of zero volts relative to a ground, and waveform 410 oscillates above and below the voltage level represented by line 420. The voltage represented by voltage 414 is referred to as a peak voltage for waveform 410. In various embodiments, line 422 represents an equivalent direct current (DC) value for a sinusoidal voltage represented by waveform 410, often expressed as a root mean square (RMS) value of the peak voltage 414. The value of the voltage at line 422 is sometimes referred to at the nominal voltage level for a voltage waveform. Peak voltage 414 is determined to be a value represented by the difference between a voltage level at line 420 and a peak voltage level of voltage waveform 410. The value of the voltage at line 422 is determined by dividing a value of peak voltage 414 by the square root of 2. In various embodiments, any one of the peak-to-peak voltage 412, peak voltage 414, and nominal voltage at line 422 can be used as the determined voltage level for the line source provided to the comparator circuit in order to determine if a heating element should be included in the charging circuit used during a charging operation. In various embodiments, for a given waveform 410, different values apply for the determined voltage level to be compared to the battery pack voltage depending on which one of the peak-to-peak, peak, or nominal voltage levels are used as the determined voltage level for the line source.

In various embodiments, waveform 430 has a same period 418, and a same phase as waveform 410, and is referenced to a same voltage line 420 as waveform 410, but has a smaller amplitude, wherein the peak-to-peak voltage 432 of voltage waveform 430 is less than the peak-to-peak voltage 412 for waveform 410, and wherein a peak voltage 434 for voltage waveform 430 is less then the peak voltage 414 for waveform 410. In various embodiments, voltage waveform 430 is generated by providing voltage waveform 410 to a charging circuit including the heater in the electrical path of the charging circuit, wherein the heater acts as a voltage divider to provide waveform 430 at the inputs to a power supply used in charging a battery pack. In various embodiments, voltage waveforms 410 and 430 represent voltage waveforms for input electrical power provided at separate times to a power supply used to recharge a battery pack. Voltage waveform 410 represent a voltage waveform for electrical power provided to the power supply when the heater is bypassed in the charging circuit, and voltage waveform 430 represents a voltage waveform for electrical power provided to the power supply when the heater is electrically coupled in the charging circuit.

By providing a reduced amplitude voltage waveform 430 to the power supply, the power supply is able to properly control the current used to charge the battery pack when the battery pack voltage level is low and the difference between the battery pack voltage and for example the peak-to-peak voltage of the line source used in the charging circuit exceeds a pre-determined value, such as the line voltage offset value, as described herein.

Figure 4B:
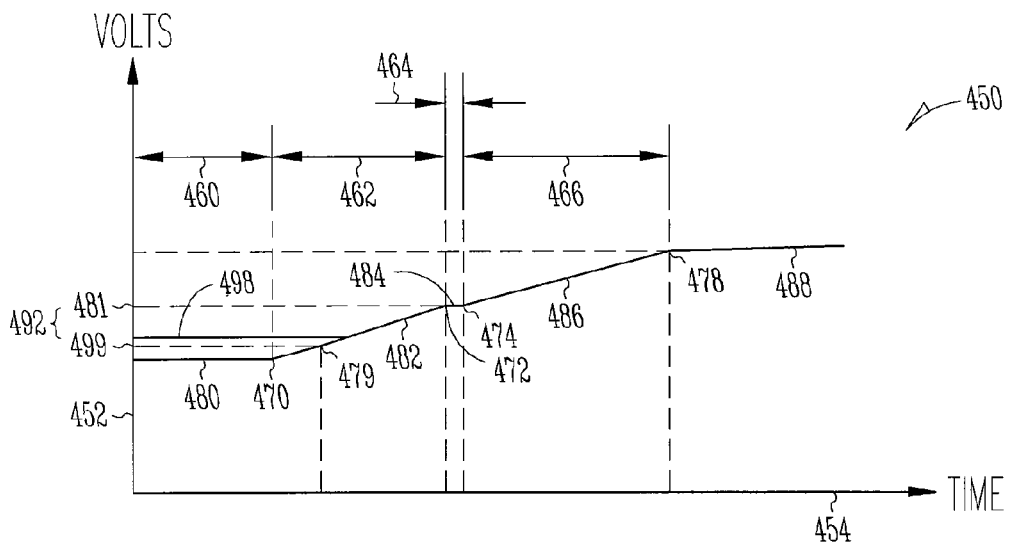
FIG. 4B shows a graph of a voltage level for a battery pack during a charging operation according to various embodiments of the present subject matter.

FIG. 4B shows a graph 450 of a voltage level for a battery pack during a charging operation according to various embodiments of the present subject matter. Graph 450 includes a vertical axis 452 representing a voltage level of a rechargeable battery pack, and a horizontal axis 454 representing time. In various embodiments, the voltage level depicted in graph 450 is the voltage level the vehicle propulsion battery 104 of FIG. 1. In various embodiments, the voltage level depicted in graph 450 is the voltage level between terminals 253 and 254 of battery pack 252 of FIG. 2A.

Referring again to FIG. 4B, a voltage level 480 is present at the battery pack during time period 460. At time 470, a charging operation of the battery pack is initiated. At time 470, a voltage level 480 is compared to a line voltage offset value represented by line 498, and represents a determined voltage level for the line source of the electrical power to be used in charging the battery pack. Since voltage 480 is less than the line voltage offset value, charging of the battery pack will be initialed at time 470 to include using a heating element in series with the line source and a set of power inputs to the power supply generating the charging voltage in the charging operation.

During time period 462, the charging operation including coupling the heating element in series with the line source, and the voltage level present at the battery pack increases from voltage level 480 to voltage level 481, as shown by upward slope 482. At time 472, the voltage present at the battery pack has reached voltage level 481, which is the bypass threshold value calculated based on the line voltage offset value of line 498.

During time period 464 between time 472 and time 474, charging of the battery pack is changed over so that the heating element is bypassed, and the line source is coupled directly to the power inputs of the power supply without having the heating element in series with the line source. During this time, the battery pack remains charged to approximately voltage level 481, depicted by horizontal line segment 484.

The bypassing of the heating element occurs during time period 464, beginning at time 472 and ending at time 474. At time 474, charging of the battery pack continues with the heating element bypassed in the charging circuit. Time period 466 includes a time period where charging operation continues with the heating element bypassed, charging the battery pack to a final charge voltage 488 at time 478, as represented by slope 486. The charging operation is terminated at time 478. For some time after time 478, the battery pack remains at approximately voltage level 488.

A hysteresis band 492 includes a voltage range starting at a voltage level of line 498 representing a calculated line voltage offset value, and extending to voltage level 481, representing a bypass threshold value calculated based on the voltage offset value. Hysteresis band 492 represents a difference in a value for voltage level at the battery pack for which initiating a charging operation will include using the heater in the charging circuit, and the voltage level in the charging operation wherein the charging operation will switch over to charging with the heater bypassed.

The time periods illustrated in graph 450 are not necessarily proportional, and not necessarily to the same scale. Time period 460 represents any time period prior to the initiation of a charging operation. Time period 462 is not limited ay any particular time period. In various embodiments, time period 462 is a time period of between 2 and 3 hours. Time period 464 is not limited to any particular time period. In some embodiments, time period 464 is approximate 5 seconds. In some embodiments, time period 464 is less than one second. In some embodiments, time period 464 is less than 150 milliseconds.

Time period 466 is not limited to any particular time period. In various embodiments, time period 466 is between 2 and 4 hours. In some embodiments, time periods 466 is more than 4 hours. In some embodiments, time period 466 is less than 2 hours.

Time period 466 ends at time 478 when the voltage level 488 is present at the battery pack. Voltage level 488 is not limited to any particular voltage level. In various embodiments, voltage level 488 is a predetermined voltage level associated with a particular charge level. In various embodiments, voltage level 488 represents a battery voltage level present on the battery pack when the battery pack is charged to approximately an 80% charge level. In various embodiments, the 80% charge level represents a battery voltage present on the battery pack and provided by the battery pack of approximately 405 volts DC.

In various embodiments, voltage level 488 represents a battery voltage level present at the battery pack when the battery is charged to approximately a 100% charge level. In various embodiments, the 100% charge level represents a voltage level present on the battery pack and provided by the battery pack of in a range of approximately 410-412 volts DC.

In various embodiments, a final voltage level to which the charging operation is to charge the battery pack to is less than a voltage level wherein the battery pack can be charged during a charging operation without using the heating element in the charging circuit. By way of illustration, a low level charge for a battery pack may be desirable as the final charge voltage for a battery pack when the battery pack is being stored, or when the vehicle in which the battery pack is installed is not going to be operated for some extended period of time. In such instances, a targeted voltage level for the battery pack at the conclusion of a charging operation may be a low voltage level, such as a voltage level representative of a 50% charge level for the battery pack. The lower charge level may be referred to as a storage charge level.

In various embodiments, the storage charge level may be a voltage level that is below any volt level wherein the difference between the determined voltage for the line source voltage and the final charge level for the battery pack being charged to a storage charge level will always be greater than the pre-determined difference voltage level. In such instances, any charging of the battery pack up to the storage charge voltage level will be done by having the heating element included in the charging circuit. This is illustrated in graph 450 as the time period between time 470 and 479, wherein a charging operation is initiated at time 470 including having the heating element included in the charging circuit. At time 479, the voltage level at the battery pack has reached the storage charge voltage level 499, but the voltage level has not yet reached voltage level 481. When charging a battery pack to the storage charge voltage level as illustrated in graph 450, the charging operation is terminate at time 479, wherein the entire charging operation has been performed with the heating element having been included in the charging circuit and without going through the switching operation to bypass the heating elements as shown for time period 464.

Figure 5:
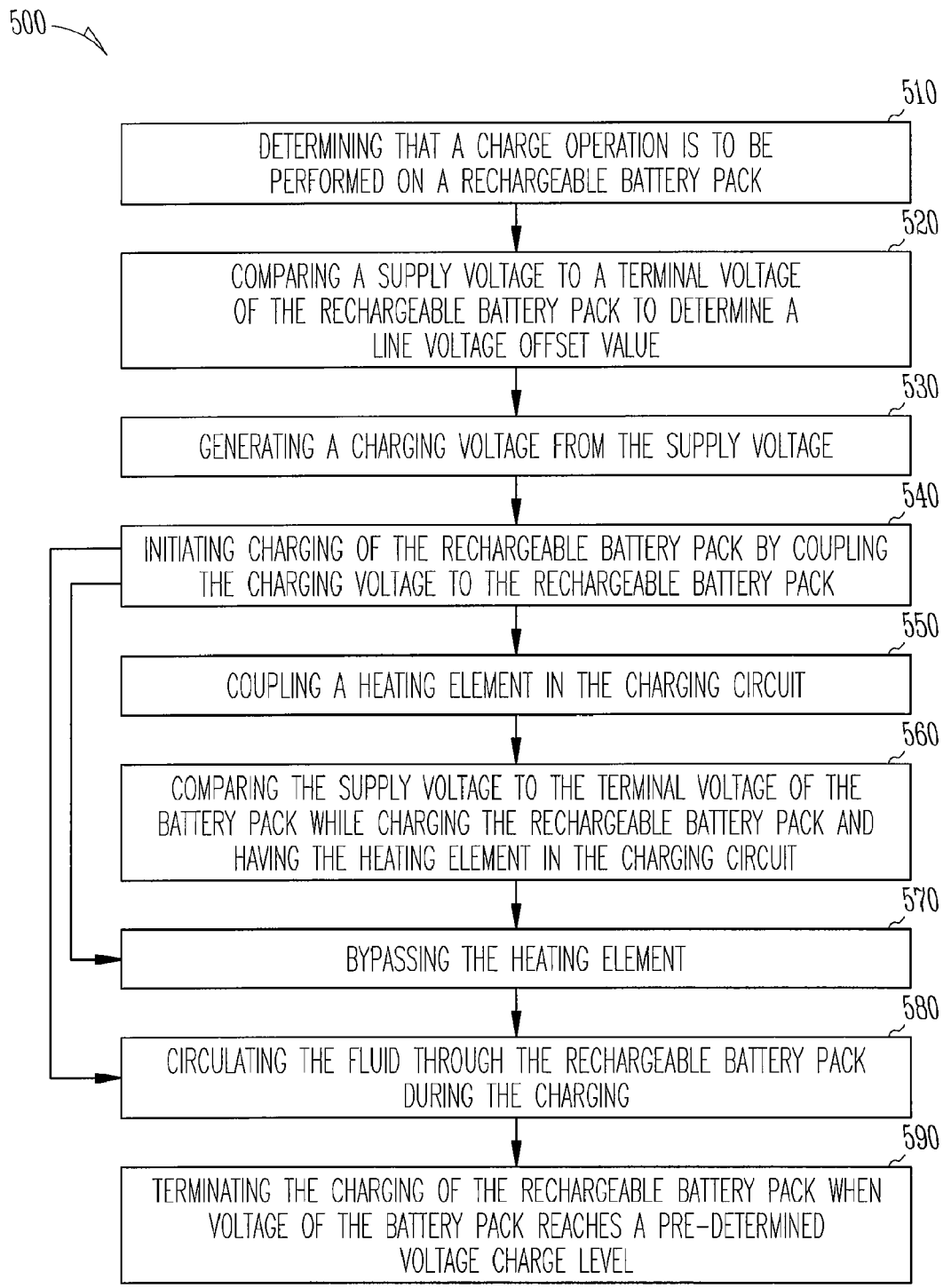
FIG. 5 shows a flowchart for one or more methods according to various embodiments of the present subject matter.

FIG. 5 shows a flowchart of method 500 according to various embodiments of the present subject matter.

At block 510, method 500 includes determining that a charge operation on a rechargeable battery pack is to be performed. In various embodiments, determining that a charge operation on a rechargeable battery pack is to be performed includes determining that the rechargeable battery pack is to be charged to one of a plurality of predetermined battery charge levels.

At block 520, method 500 includes comparing a supply voltage to a battery voltage of the rechargeable battery pack to determine a value for a difference signal. In various embodiments, comparing a supply voltage to a battery voltage includes providing an output signal if the difference between the compared supply voltage and the battery voltage exceeds a pre-determined difference threshold value.

At block 530, method 500 includes generating a charging voltage from the supply voltage. In various embodiments, generating a charging voltage from the supply voltage includes the supply voltage being an alternating current power source having a sinusoidal voltage waveform.

At block 540, method 500 includes initiating charging of the rechargeable battery pack by coupling the charging voltage to the rechargeable battery pack. In various embodiments, block 540 includes block 550 if the difference between the compared supply voltage and the battery voltage exceeds the pre-determined voltage level, and includes block 560 if the difference between the compared supply voltage and the battery voltages does not exceed the pre-determined voltage level. In various embodiments, initiating charging and charging of the rechargeable battery pack includes controlling a current provided during the charging both when the heating element is coupled between the voltage source and the rechargeable battery pack and when the heating element is bypassed.

At block 550, method 500 includes coupling the charging voltage to the rechargeable battery pack including coupling a heating element between the charging voltage and the rechargeable battery pack when the value of the difference signal exceeds a predetermined voltage level.

At block 560, method 500 includes comparing the supply voltage to the battery voltage while charging the rechargeable battery pack and having the heating element between the charging voltage and the rechargeable battery pack to determine the difference signal, and bypassing the heating element and continuing the charging when the difference signal is less than a predetermined bypass threshold level.

At block 570, method 500 includes bypassing the heating element when the value of the difference signal does not exceed the predetermined voltage value, the heating element operable to heat a fluid circulated through the rechargeable battery pack.

At block 580 method 500 includes circulating the fluid through the rechargeable battery pack during the charging while the heating element is coupled between the charging voltage and the rechargeable battery pack. In various embodiments, block 580 further includes monitoring a temperature of rechargeable battery pack, and cooling the fluid circuited through the recharge battery pack when the monitored temperature exceeds a predetermined temperature level.

At block 590, method 500 includes terminating the charging of the rechargeable battery pack when the voltage of the battery pack reaches a pre-determined voltage charge level. In various embodiments, reaching the pre-determined voltage charged level and terminating the charging occurs when the charging includes charging with the heating elements coupled between the charging voltage and the rechargeable battery pack. In various embodiments, reaching the pre-determined voltage charged level and terminating the charging occurs when charging includes charging the rechargeable battery pack with the heating elements is bypassed.

Embodiments of systems, methods, and apparatus for an intelligent power source for battery charging have been described herein. Various embodiments include an apparatus comprising a rechargeable battery pack installed in an electric vehicle, the rechargeable battery pack coupled to a power supply, the power supply operable to provide a charge voltage to perform charging operations on the battery pack, a heating element to heat a fluid to be circulated through the rechargeable battery pack, the fluid thermally coupled to battery cells within the rechargeable battery pack, a comparator circuit to compare a battery voltage of the rechargeable battery pack to a line source voltage coupled to inputs of the power supply, the comparator circuit operable to compare the battery voltage to the line source voltage and to provide an output signal when the battery voltage is less than a line voltage offset value, the line voltage offset value calculated based on a value added to a determined voltage level for the line source voltage, and a control circuit coupled to receive the output signal of the comparator, and when a charge operation of the rechargeable battery pack is to be initiated, the control circuit is operable to couple the line source voltage to the power supply, wherein the control circuit is to couple the heating element in series between the line source voltage and the power supply when the comparator circuit is providing the output signal indicating that the battery voltage is less than the line voltage offset value, and to bypass the heating element if the comparator is not providing the output signal indicating that the battery voltage is less than the line voltage offset value.

Various embodiments include a method comprising determining that a charge operation on a rechargeable battery pack is to be performed, comparing a supply voltage to a battery voltage of the rechargeable battery pack to determine a line voltage offset value, generating a charging voltage from the supply voltage, and initiating charging of the rechargeable battery pack by coupling the charging voltage to the rechargeable battery pack, wherein coupling the charging voltage to the rechargeable battery pack includes coupling a heating element between the supply voltage and a set of power inputs to a power supply providing the charge voltage to the rechargeable battery pack when the battery voltage is less than a line voltage offset value, and bypassing the heating element when the battery voltage is not less than the line voltage offset value.

Various embodiments include a system comprising a vehicle including a rechargeable battery pack, the rechargeable battery pack to provide at least a portion of the power used to propel the vehicle, a heating element to heat a fluid to be circulated through the rechargeable battery pack, the fluid thermally coupled to battery cells within the rechargeable battery pack, an intelligent power source operable to couple to a line source of electrical power and to detachably coupled to the vehicle, the charger to provide electrical power from the line source for performing charging operations of the rechargeable battery pack, a comparator circuit to compare a battery voltage of the rechargeable battery pack to a line source voltage coupled to inputs of the power supply, the comparator circuit operable to compare the battery voltage to the line source voltage and to provide an output signal when the battery voltage is less than a line voltage offset value, the line voltage offset value calculated based on a value added to a determined voltage level for the line source voltage, and a control circuit coupled to receive the output signal of the comparator, and when a charge operation of the rechargeable battery pack is to be initiated, the control circuit is operable to couple the line source voltage to the power supply, wherein the control circuit is to couple the heating element in series between the line source voltage and the power supply when the comparator circuit is providing the output signal indicating that the battery voltage is less than the line voltage offset value, and to bypass the heating element if the comparator is not providing the output signal indicating that the battery voltage is less than the line voltage offset value.

Various embodiments include an apparatus comprising a rechargeable battery pack installed in an electric vehicle, a power supply coupled to the rechargeable battery pack, the power supply operable to provide a charge voltage to perform charging operations on the rechargeable battery pack, a heater to heat a fluid to be circulated through the rechargeable battery pack, the fluid thermally coupled to a plurality of battery cells within the rechargeable battery pack, a switching circuit, the switching circuit coupled to the heater and to the power supply, the switching circuit operable in a first mode to couple the source of electrical power to the heater without coupling the source of electrical power to the rechargeable battery pack, the switching circuit operable in a second mode to couple a source of electrical power external to the electric vehicle to the power supply to form a recharging circuit in order to perform charging operations on the rechargeable battery pack, wherein the switching circuit is operable to couple the heater in the recharging circuit during at least some portion of the recharging operations, or to perform the charging operation in the first mode without coupling the heater in the recharging circuit during any portion of the recharging operations.

Various embodiments include a method comprising determining in a first mode that a rechargeable battery pack in an electric vehicle needs to be heated, and coupling power from a source external to the electric vehicle across a heater that is thermally coupled to the rechargeable battery pack, determining in a second mode that a charge operation on a rechargeable battery pack is to be performed by comparing a supply voltage to a battery voltage of the rechargeable battery pack to determine a line voltage offset value, generating in the second mode a charging voltage from the supply voltage, and initiating in the second mode a charging of the rechargeable battery pack by coupling the charging voltage to the rechargeable battery pack, wherein coupling the charging voltage to the rechargeable battery pack includes coupling the heating element in series between the supply voltage and a set of power inputs to a power supply providing the charge voltage to the rechargeable battery pack when the battery voltage is less than a line voltage offset value, and bypassing the heating element when the battery voltage is not less than the line voltage offset value.

Various embodiments include a system comprising a vehicle including a rechargeable battery pack, the rechargeable battery pack to provide at least a portion of the power used to propel the vehicle, a heating element to heat a fluid to be circulated through the rechargeable battery pack, the fluid thermally coupled to battery cells within the rechargeable battery pack, a charger operable to couple to a line source of electrical power and to detachably coupled to the vehicle, the charger to provide electrical power from the line source for performing charging operations of the rechargeable battery pack, a comparator circuit to compare a battery voltage of the rechargeable battery pack to a line source voltage coupled to inputs of the power supply, the comparator circuit operable to compare the battery voltage to the line source voltage and to provide an output signal when the battery voltage is less than a line voltage offset value, the line voltage offset value calculated based on a value added to a determined voltage level for the line source voltage, and a control circuit coupled to receive the output signal of the comparator, and when a charge operation of the rechargeable battery pack is to be initiated, the control circuit operable to couple the line source voltage to the power supply, wherein the control circuit is to couple the heating element in series between the line source voltage and the power supply when the comparator circuit is providing the output signal indicating that the battery voltage is less than the line voltage offset value, and to bypass the heating element if the comparator is not providing the output signal indicating that the battery voltage is less than the line voltage offset value.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:
1. An apparatus comprising:
a rechargeable battery pack installed in an electric vehicle;
a power supply coupled to the rechargeable battery pack, the power supply operable to provide a charge voltage to perform charging operations on the rechargeable battery pack, wherein the power supply is coupleable to a power source external to the electric vehicle;
a heater, wherein said heater is coupleable to a recharging circuit to provide a voltage divider circuit within said recharging circuit;
a switching circuit, the switching circuit coupled to the heater and to the power supply,
the switching circuit operable in a first mode to couple the power supply and the power source to the heater and to the rechargeable battery pack to perform charging operations on the rechargeable battery pack, wherein said heater provides said voltage divider circuit within said recharging circuit used during charging operations when the switching circuit operates in said first mode,
the switching circuit operable in a second mode to couple the power supply and the power source to the rechargeable battery pack without coupling the heater to the recharging circuit to perform charging operations on the rechargeable battery pack, wherein the heater is bypassed within said recharging circuit when the switching circuit operates in said second mode.

2. The apparatus of claim 1, including:
a charging control circuit coupled to the switching circuit, the charging control circuit operable to configure one or more switches within the switching circuit in order to provide either the first mode or the second mode.

3. The apparatus of claim 1, wherein in the first mode the switching circuit connects the heater in series with one connection of the power source and with one input connection to the power supply.

4. The apparatus of claim 1, wherein in the first mode the switching circuit connects the heater in series with one output connection of the power supply and with one terminal of the rechargeable battery pack.

5. The apparatus of claim 1, the switching circuit operable in a third mode to connect the heater directly to the power supply and the power source without connecting the power supply and the power source to the rechargeable battery.

6. The apparatus of claim 1, the switching circuit operable in a fourth mode to disconnect the heater from the power supply, and to connect the heater directly to the rechargeable battery pack in order to power the heater using electrical power provided by the rechargeable battery pack.

7. The apparatus of claim 1, further including:
a comparator circuit to compare a battery voltage level of the rechargeable battery pack to a line voltage offset value, wherein said comparator circuit calculates said line voltage offset value from a line voltage level of said power source, and to provide an output signal when the battery voltage level is less than said line voltage offset value, the line voltage offset value calculated based on an offset value added to said line voltage level; and
a charging control circuit configured to receive the output signal of the comparator circuit, wherein the charging control circuit selects said first mode for the switching circuit upon receipt of the output signal from the comparator circuit.

8. The apparatus of claim 7, wherein the comparator includes a microcontroller, and wherein the offset value added is stored in software accessible by the microcontroller.

9. The apparatus of claim 7, wherein the comparator includes a digital signal processor.

10. The apparatus of claim 1, wherein the rechargeable battery pack is comprised of a plurality of 18650 form-factor lithium-ion cells.

11. The apparatus of claim 7, wherein the offset value is selected from negative values, positive values and zero.

12. The apparatus of claim 7, wherein when the switching circuit is operating in said first mode said comparator circuit provides a second output signal when the battery voltage level is less than a bypass threshold value for said line voltage offset value, and wherein said charging control circuit selects said second mode for the switching circuit upon receipt of the second output signal from the comparator circuit.

13. The apparatus of claim 7, wherein said comparator circuit outputs a second signal when the battery voltage level is not less than said line voltage offset value, and wherein said charging control circuit selects said second mode for the switching circuit upon receipt of the second output signal from the comparator circuit.

14. The apparatus of claim 1, further comprising:
a comparator circuit to compare a battery voltage level of the rechargeable battery pack to a line voltage offset value, wherein said comparator circuit calculates said line voltage offset value from a line voltage level of said power source, and to provide an output signal when the battery voltage level is less than a bypass threshold value for said line voltage offset value, the line voltage offset value calculated based on an offset value added to said line voltage level; and
a charging control circuit configured to receive the output signal of the comparator circuit, wherein the charging control circuit selects said second mode for the switching circuit upon receipt of the output signal from the comparator circuit.

15. The apparatus of claim 1, wherein said heater is coupled to a battery pack heating system, and wherein said heater is operable to heat a fluid circulated within said battery pack heating system and through said rechargeable battery pack.

16. The apparatus of claim 15, further comprising a cooling system coupled to said battery pack heating system, wherein said cooling system is operable to cool said fluid circulated within said battery pack heating system and through said rechargeable battery pack.

17. The apparatus of claim 15, further comprising a network of tubing in thermal contact with a plurality of cells comprising said rechargeable battery pack, wherein said fluid circulates through said network of tubing, and wherein said fluid is operable to conduct heat to or away from said plurality of cells.

18. The apparatus of claim 1, wherein said heater is comprised of a resistive type heating element.

19. The apparatus of claim 1, further comprising:
a temperature sensor for monitoring a heater temperature; and
a vehicle management system coupled to said temperature sensor, wherein said vehicle management system is operable to disconnect said heater from a source of electrical power if said heater temperature exceeds a preset temperature.

20. The apparatus of claim 1, further comprising a thermally operated safety switch coupled to said heater, wherein said thermally operated safety switch disconnects said heater from a source of electrical power if a temperature at said heater exceeds a preset temperature.

21. The apparatus of claim 1, further including:
a battery pack temperature sensor for monitoring a rechargeable battery pack temperature;
a battery pack heating/cooling system coupled to said rechargeable battery pack; and
a charging control circuit coupled to said battery pack temperature sensor and said battery pack heating/cooling system, wherein if said rechargeable battery pack temperature is not within a preset temperature range said charging control circuit prevents said charging operations, and wherein if said rechargeable battery pack temperature is not within said preset temperature range said charging control circuit operates said battery pack heating/cooling system to adjust said rechargeable battery pack temperature.

22. The apparatus of claim 1, further comprising a heater/ventilation/air-conditioning (HVAC) system, wherein said heater is coupled to said HVAC system.

23. The apparatus of claim 1, wherein said heater corresponds to a heating element within a seat heater.

* * * * *